April 29, 1947.  W. F. GROENE  2,419,639
LATHE TRANSMISSION AND CONTROL MECHANISM
Filed Oct. 6, 1943  14 Sheets-Sheet 1
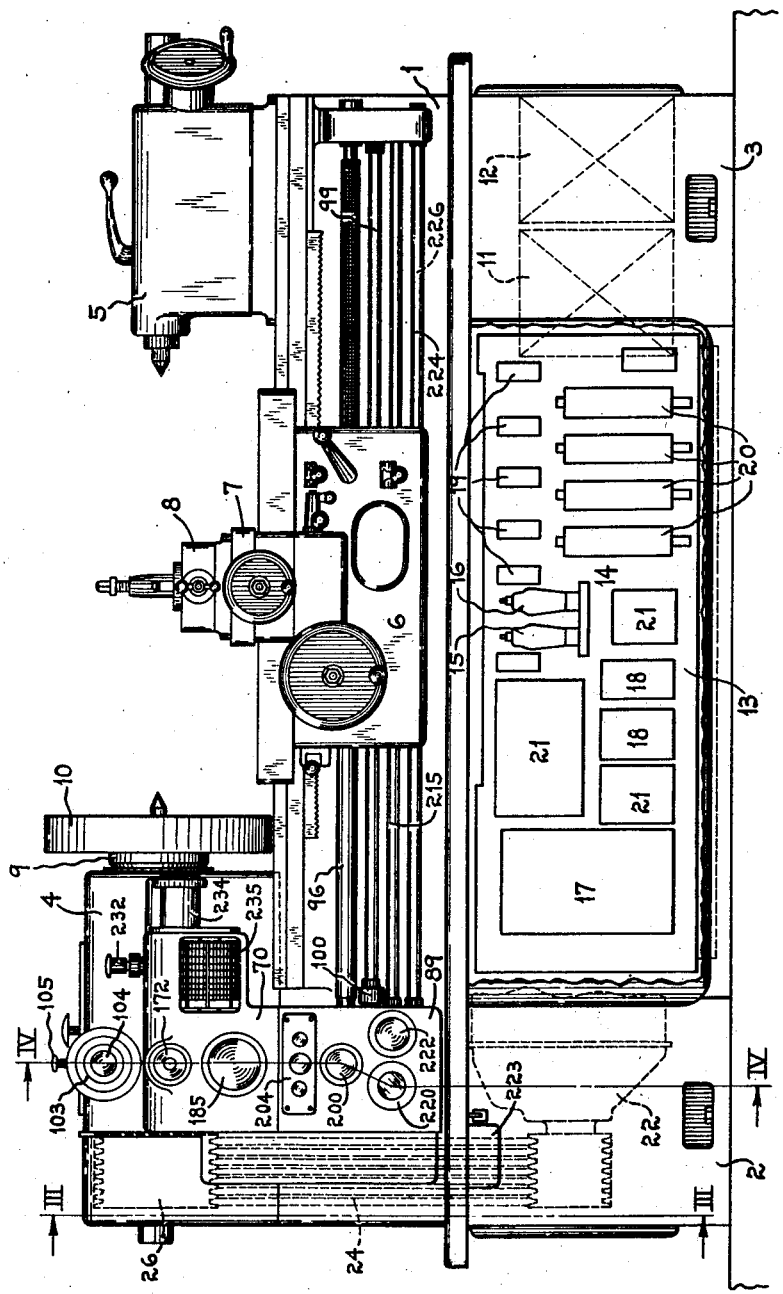
FIG. I
INVENTOR.
WILLIAM F. GROENE
BY Willard L. Groene
ATTORNEY.

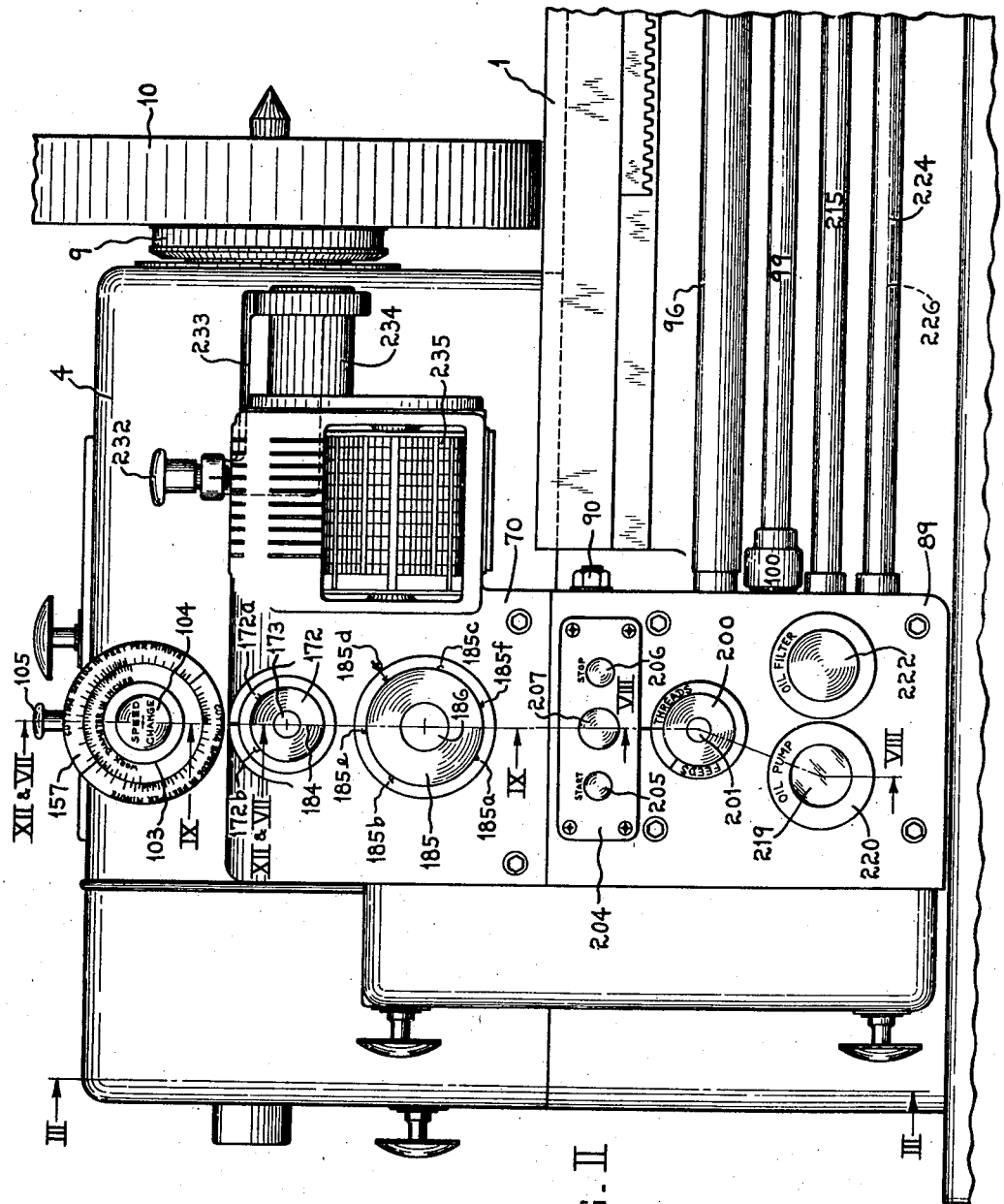

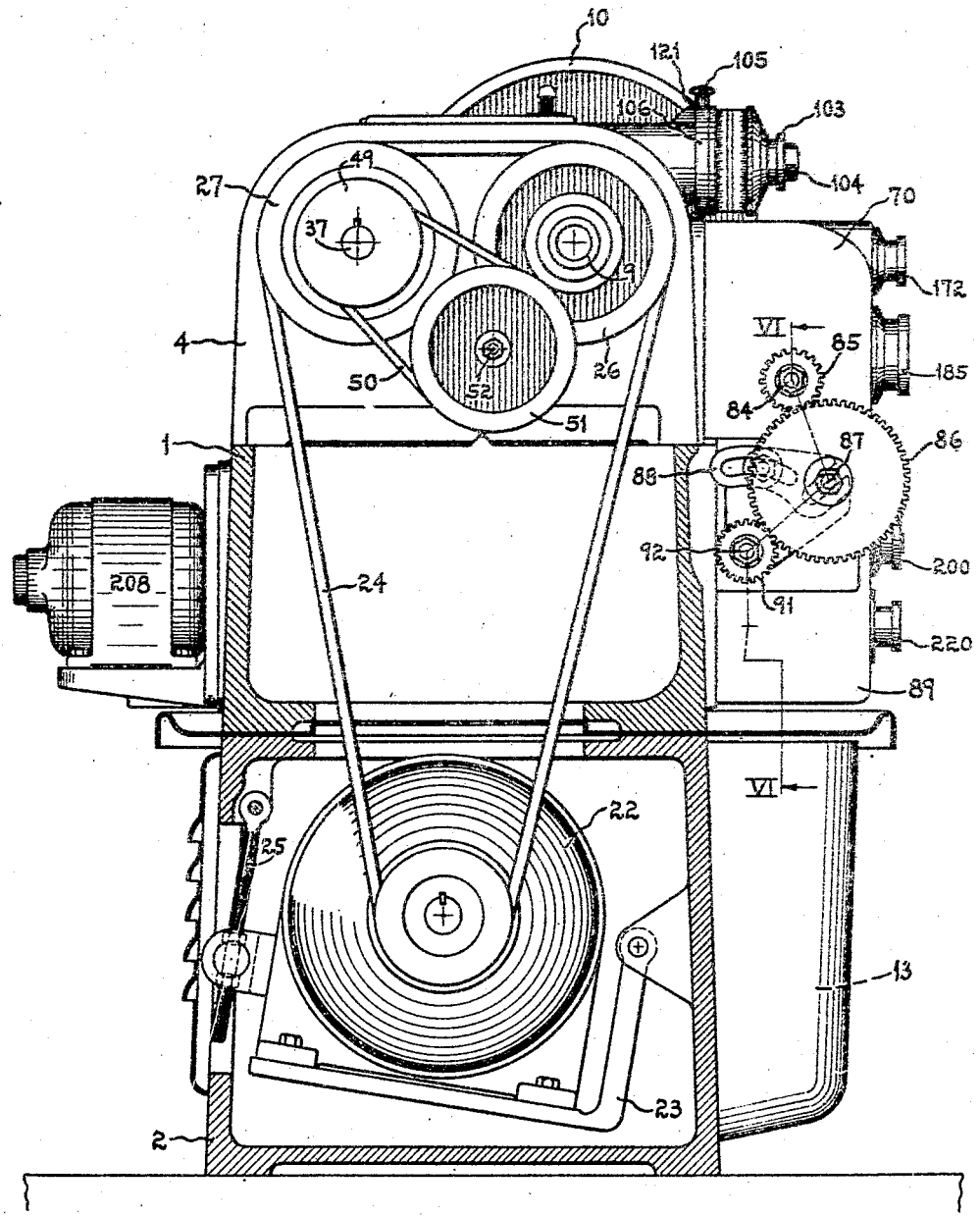
FIG. III

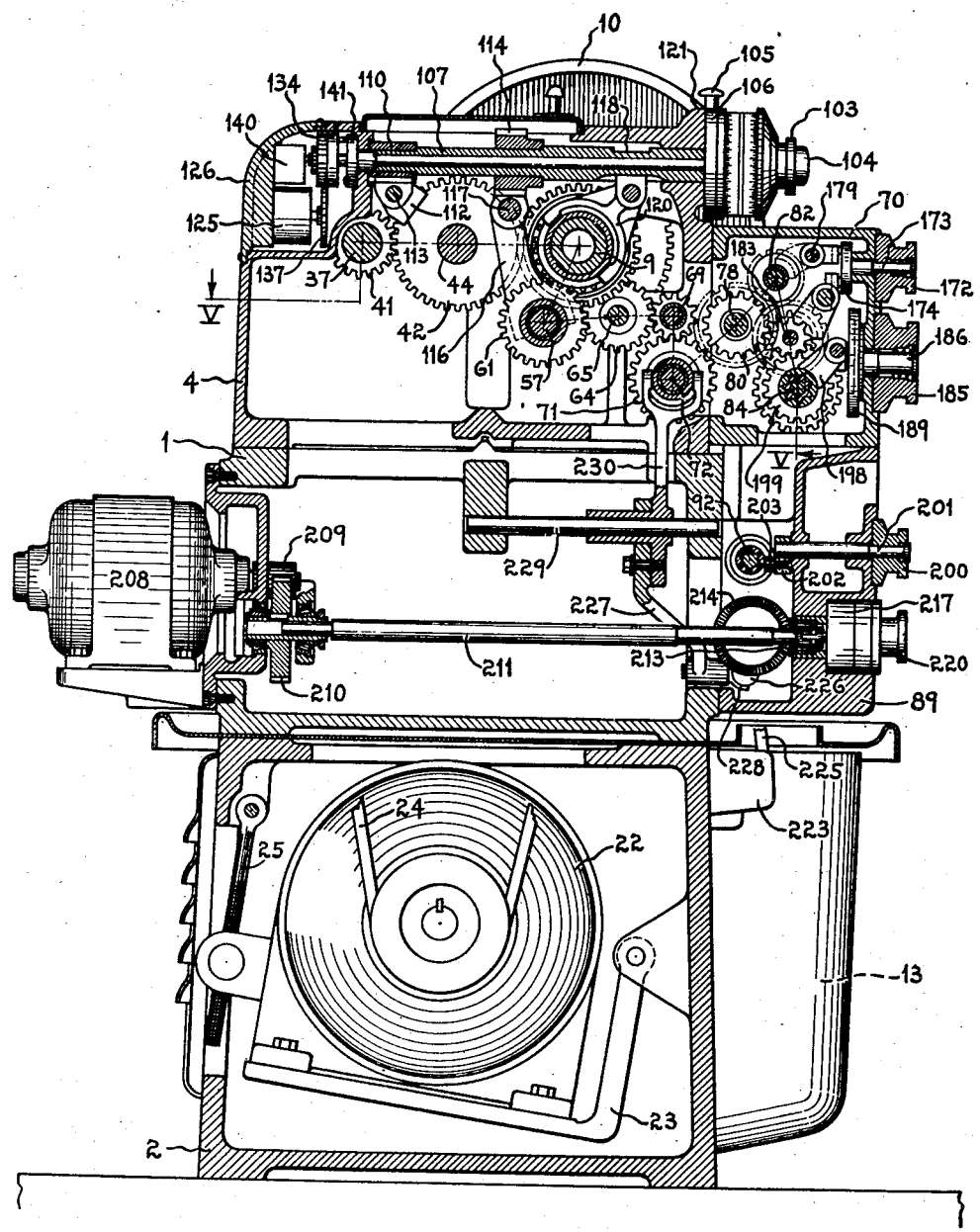
FIG. IV

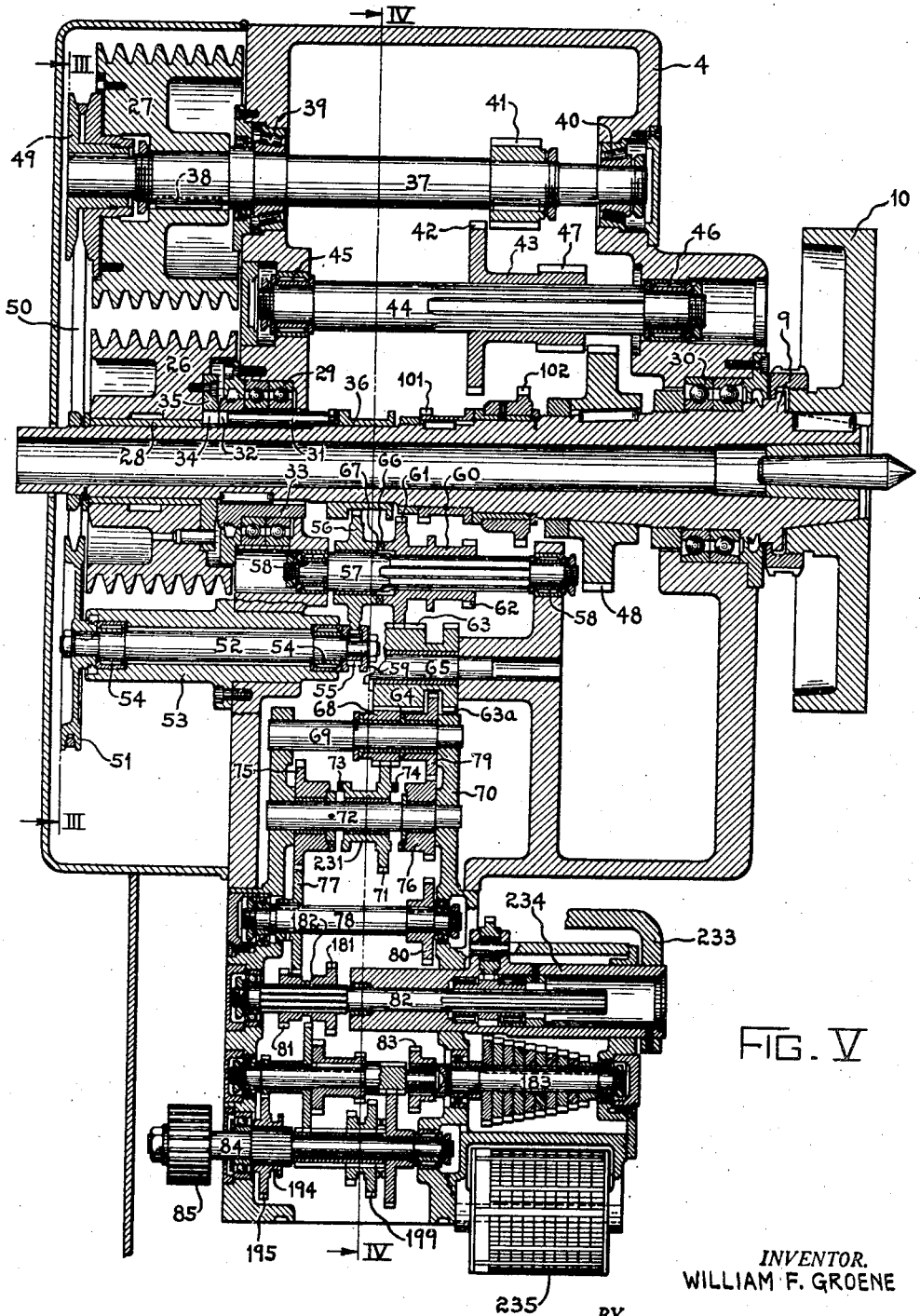
FIG. V

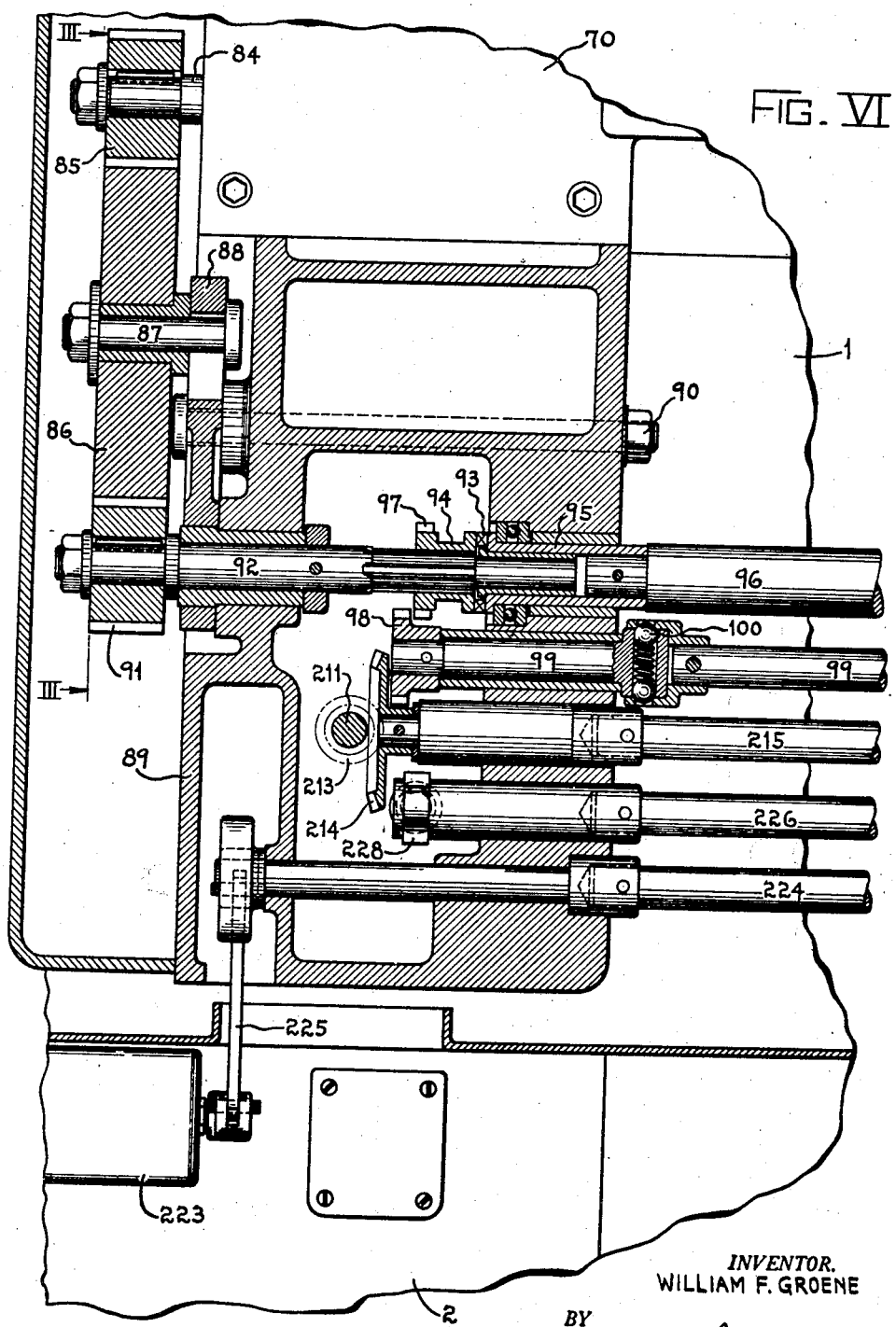

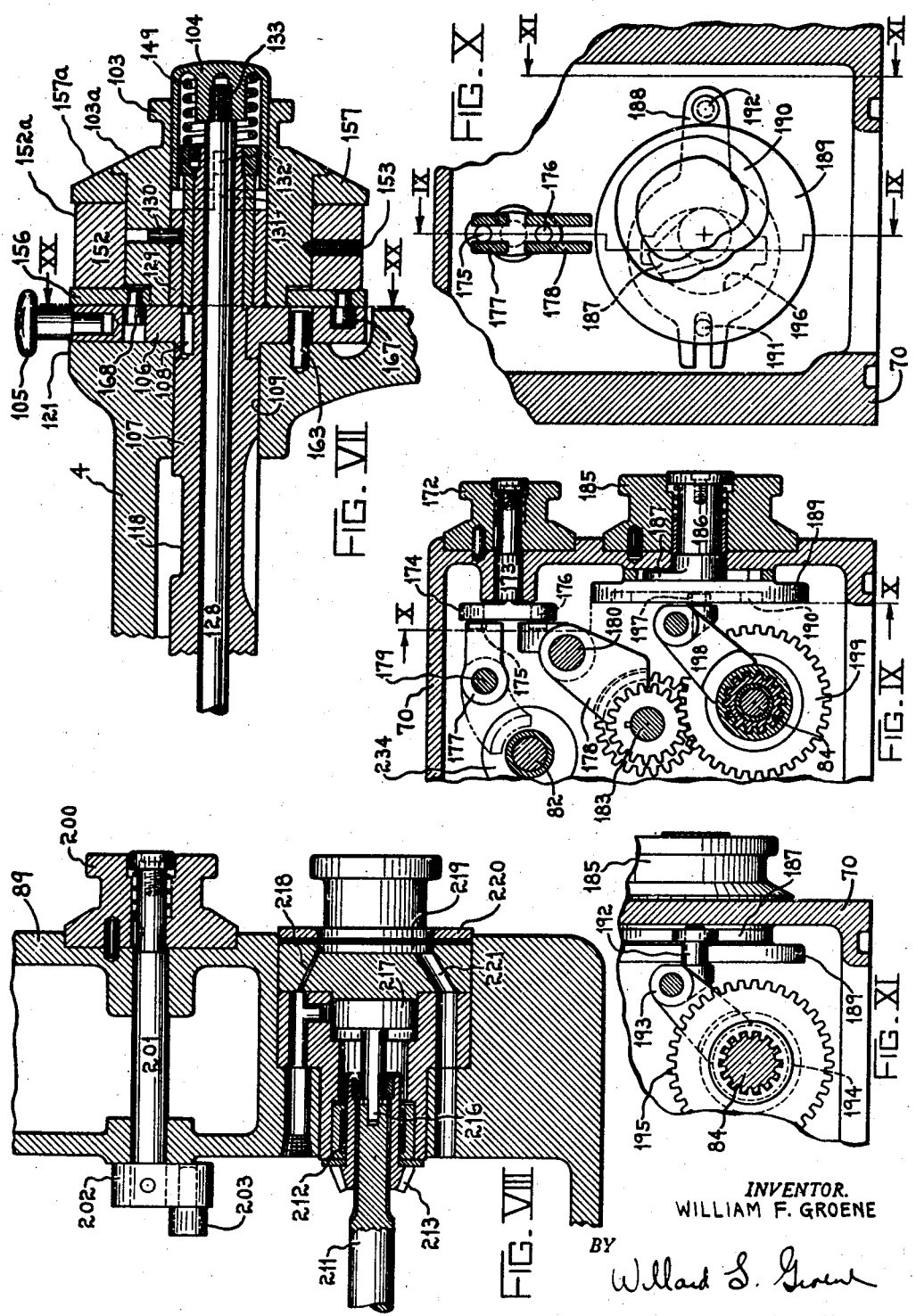

April 29, 1947.  W. F. GROENE  2,419,639
LATHE TRANSMISSION AND CONTROL MECHANISM
Filed Oct. 6, 1943  14 Sheets-Sheet 8
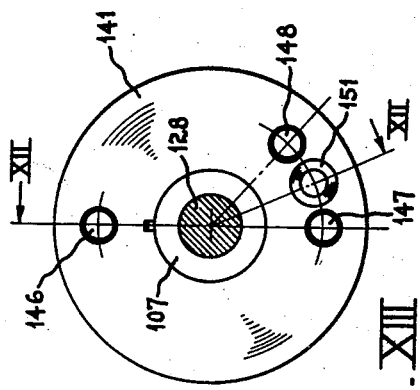
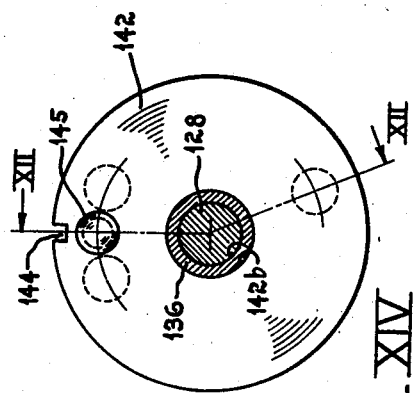
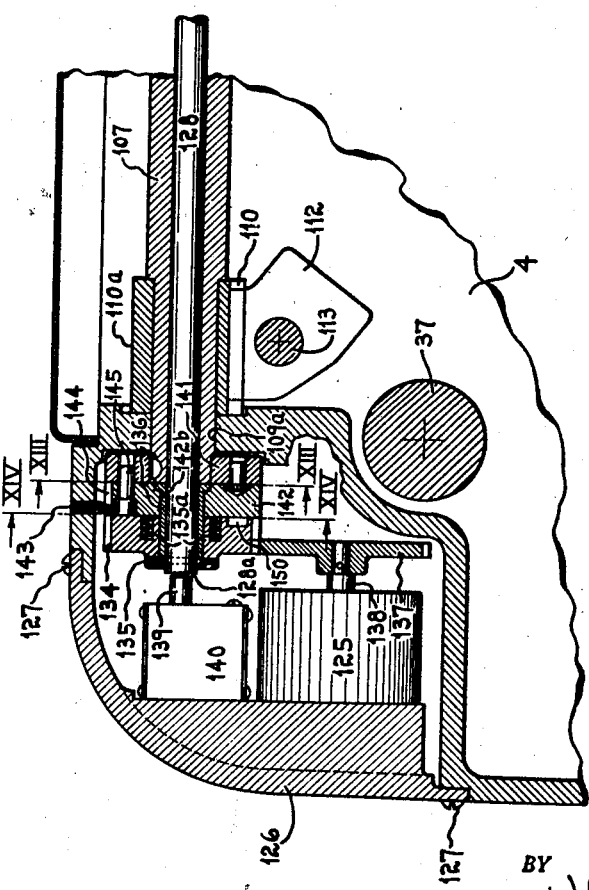
INVENTOR.
WILLIAM F. GROENE
BY
*Willard L. Groene*
ATTORNEY.

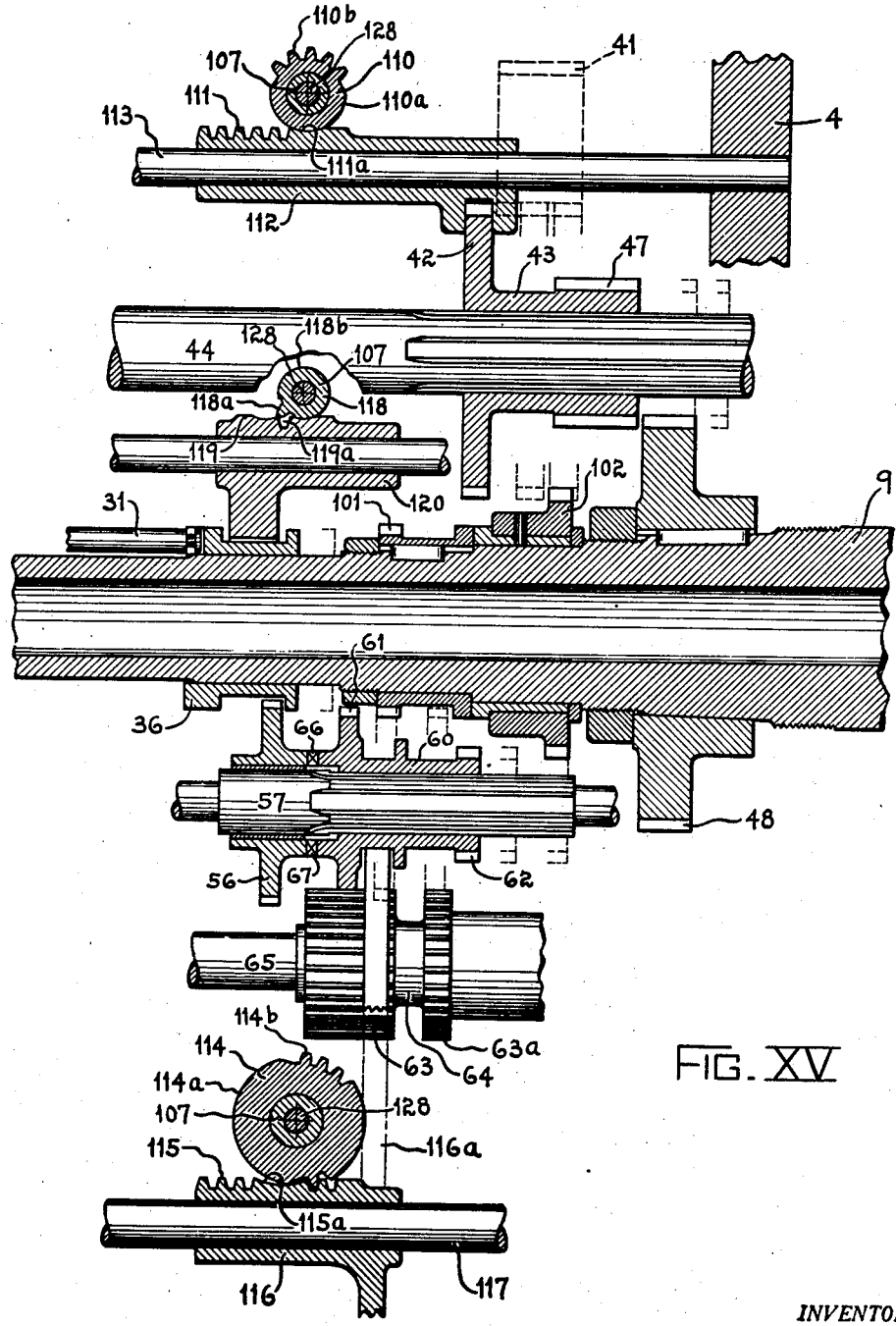

April 29, 1947.  W. F. GROENE  2,419,639
LATHE TRANSMISSION AND CONTROL MECHANISM
Filed Oct. 6, 1943  14 Sheets-Sheet 10
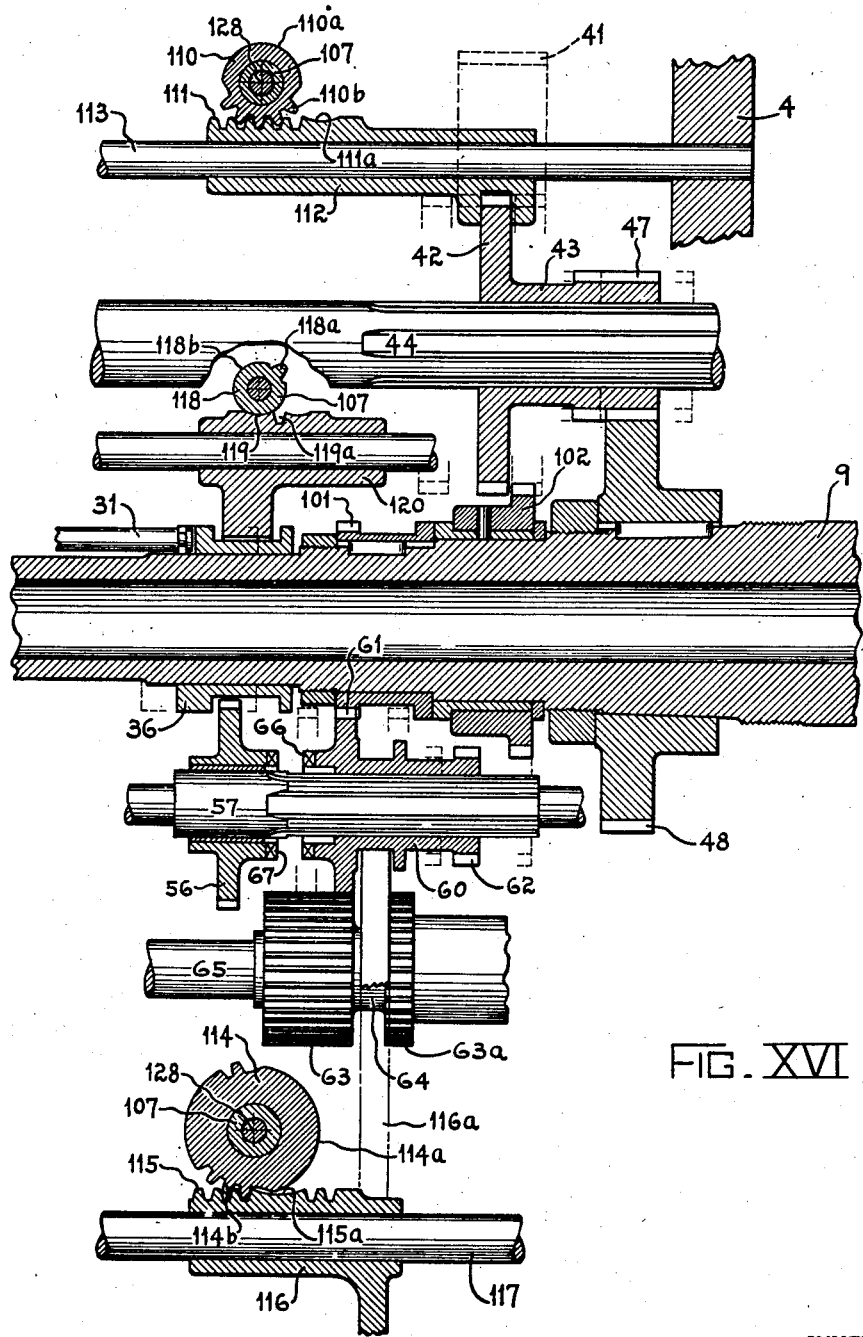
FIG. XVI
INVENTOR.
WILLIAM F. GROENE
BY
Willard S. Groene
ATTORNEY.

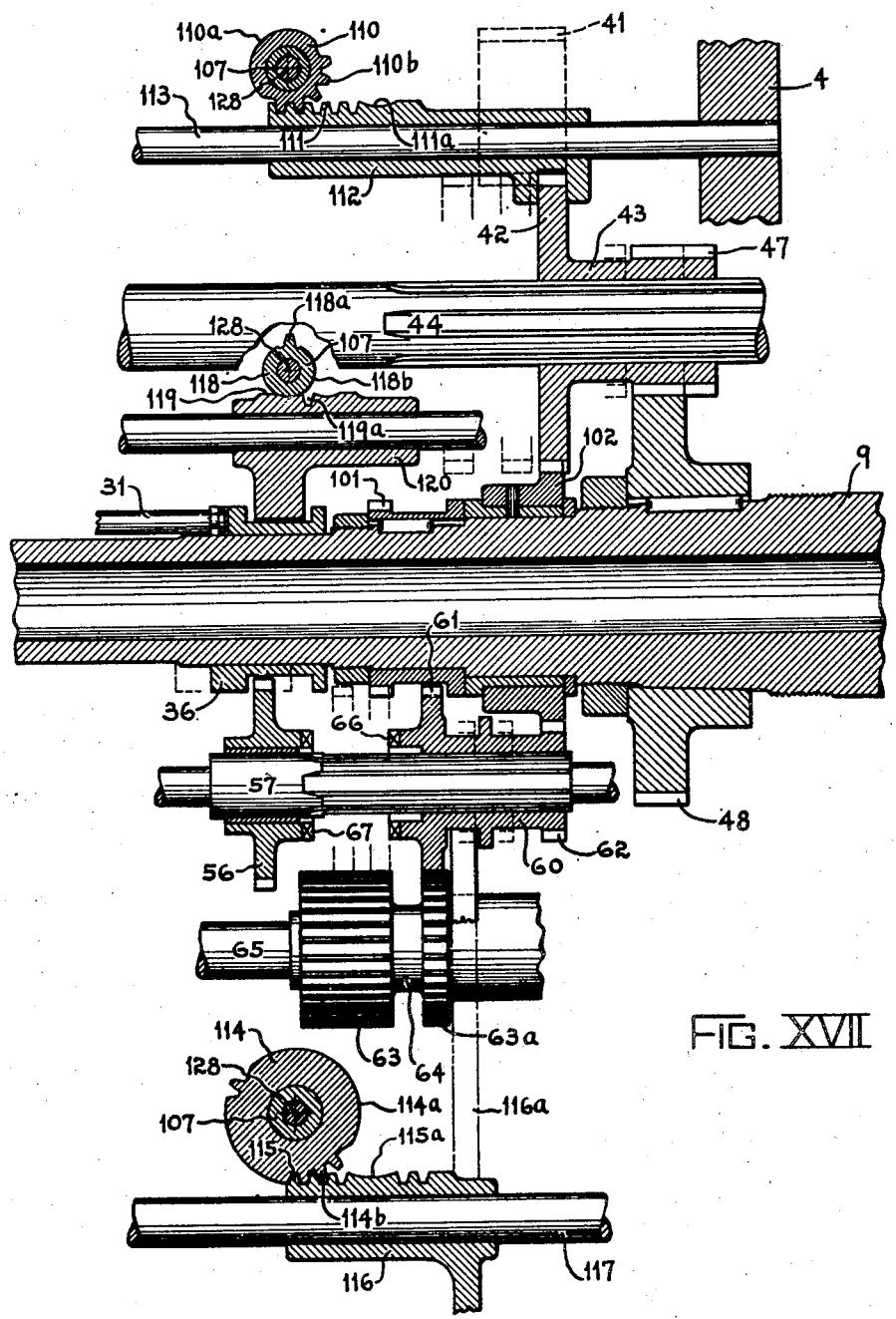
FIG. XVII
INVENTOR.
WILLIAM F. GROENE

April 29, 1947.   W. F. GROENE   2,419,639
LATHE TRANSMISSION AND CONTROL MECHANISM
Filed Oct. 6, 1943   14 Sheets-Sheet 12
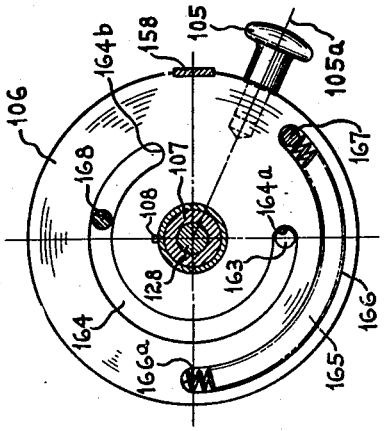
FIG. XX
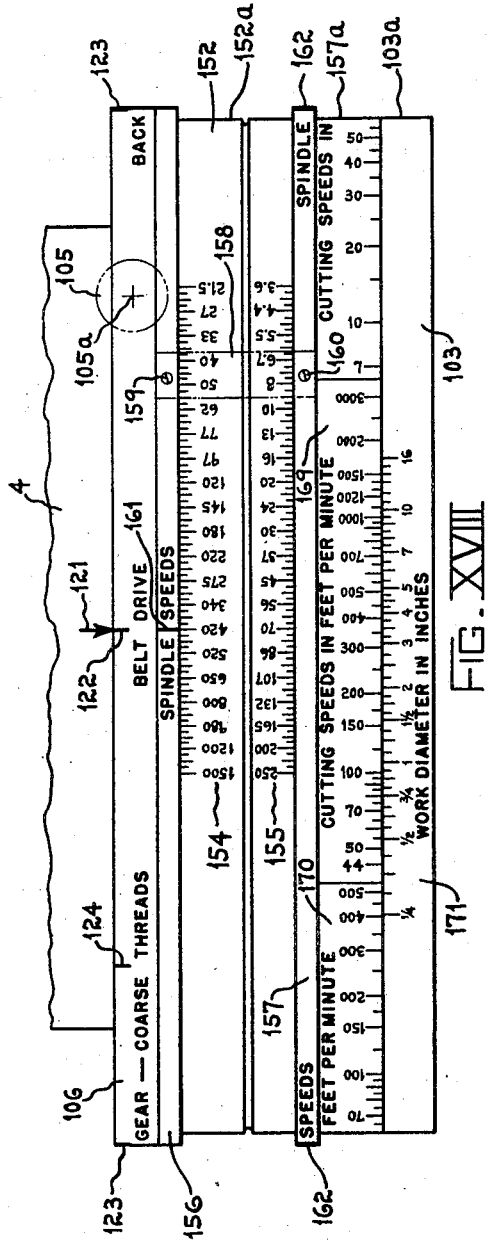
FIG. XVIII
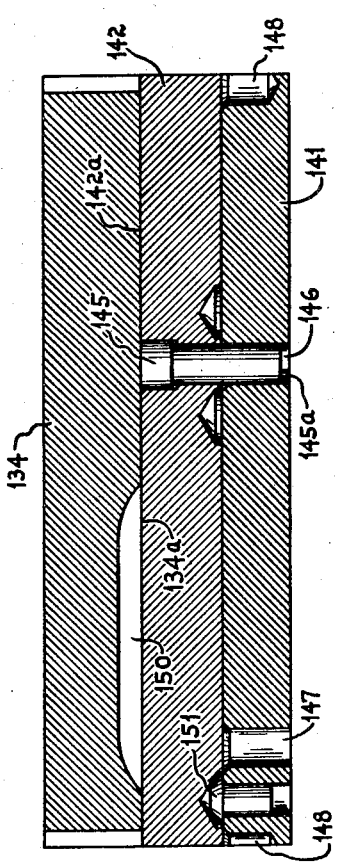
FIG. XIX
INVENTOR.
WILLIAM F. GROENE
BY
Willard S. Groene
ATTORNEY.

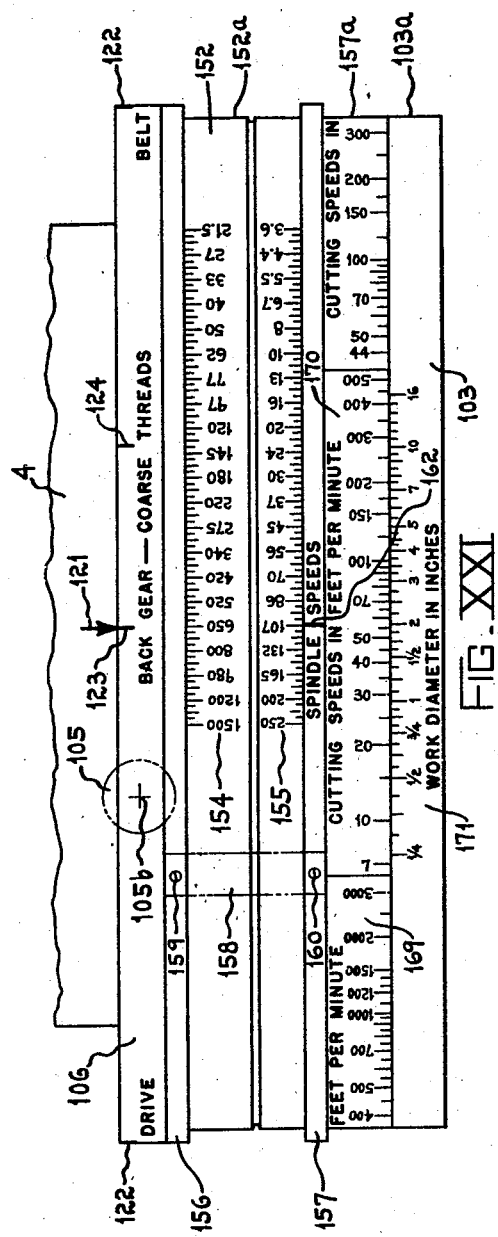

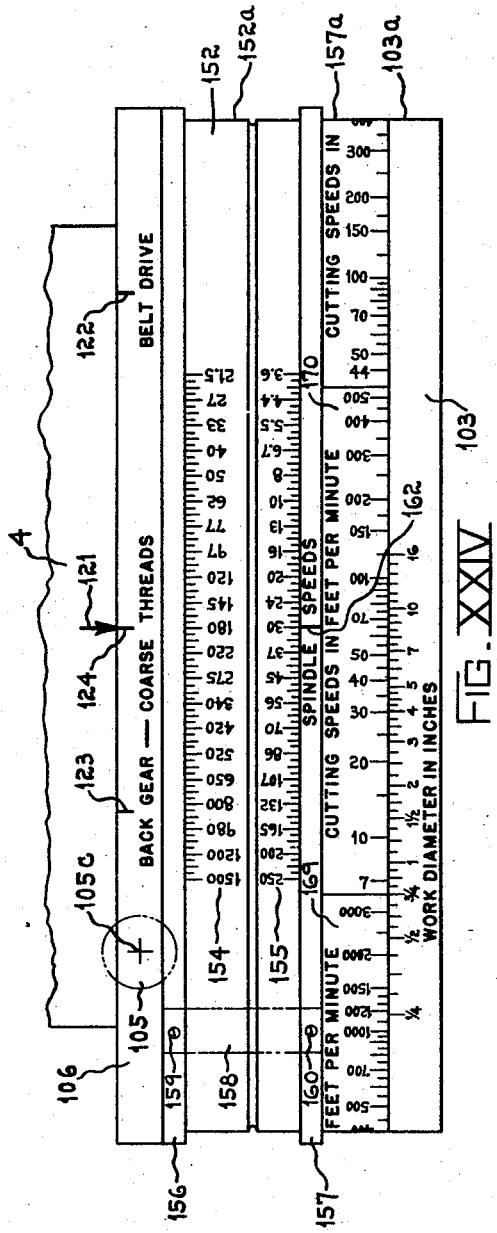
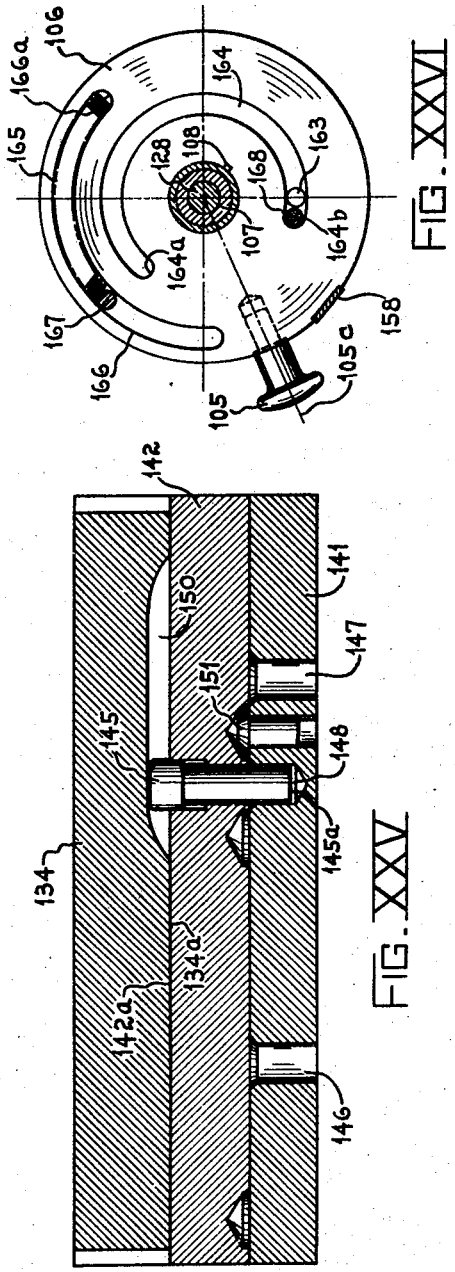

Patented Apr. 29, 1947

2,419,639

UNITED STATES PATENT OFFICE 2,419,639

LATHE TRANSMISSION AND CONTROL MECHANISM

William F. Groene, Cincinnati, Ohio, assignor to The R. K. Le Blond Machine Tool Company, Cincinnati, Ohio, a corporation of Delaware Application October 6, 1943, Serial No. 505,143

37 Claims. (Cl. 82—29)

This invention pertains to lathe transmission and control mechanism and is particularly related to such mechanisms for tool room lathes. Such types of lathes are particularly adapted for machining parts having an infinite variety of characteristics. These lathes are required for machining of work of greatly varying diameters and shapes and must be capable of performing certain specific machining operations such as, chasing of coarse lead screws, relieving attachment work on hobs and taps or the like, and the performance of an infinite variety of complex boring, turning and facing operations on every size and class of work within the range of the machine. Such a lathe obviously must be of extremely universal character both as to its adaptability to hold and cut different types of work and of rotating the work at a relatively great number of different speeds of widely varying range.

It is, therefore, the primary object of this invention to provide an improved lathe transmission especially adapted to meet these conditions in the tool room type of lathe. It is the principal idea to effect the spindle speed changes by a combination of electronic control apparatus for varying the main drive motor for the lathe transmission through a very wide range of speed and to provide, in connection with this electronic controlled motor speed variation, a specially designed transmission for providing the necessary characteristics of spindle rotation in such a tool room type lathe.

The electronic control arrangement as contemplated in conjunction with this lathe transmission and control mechanism is preferably of a type which may be supplied from a usual three phase alternating current supply, and by means of an appropriate transformer mechanism and electronic tube control apparatus a direct current motor may be actuated in a variety of accurately controlled variable speeds through a wide range. This electronically controlled variable speed D. C. motor is connected to the work spindle through a unique transmission mechanism which effects, in this particular instance, two main speed variations for the work spindle in conjunction with the variable speed D. C. motor. However, it is not only necessary to provide a speed variation in the transmission mechanism associated with the driving motor but, also, to provide certain characteristics in the drive which permits of smooth cutting and accurate work particularly when relatively high speeds are utilized with carbide cutting tools of modern day type.

The transmission mechanism associated with the variable speed electronically controlled motor is arranged to rotate the work spindle in direct belt drive through the entire range of high speeds to completely avoid the gear tooth marks, noise, and other irregularities and inaccuracies which come about in a mechanical gear drive transmission when utilized at the high speed range. At low speed range for high power roughing cuts and on extremely large diameter work requiring slow speed, spindle rotation is effected through a single back gear drive taking in account the complete variable speed range of the main drive motor.

In conjunction with the above variable speed electronically controlled motor and change speed power transmission for the work spindle, an especially arranged fine feed drive is provided when the work spindle is operating in the high belt speeds, the purpose of this fine feed being to provide a very accurate smooth feeding motion when utilizing modern day carbide cutting tools. This speed essentially is provided by belt driving means from the main drive motor so as to provide relatively smooth input driving power initially to the feed mechanism during this fine feed cutting at high spindle speeds.

Still another object is to provide, in conjunction with this unique lathe headstock transmission having the belt drive for rotating the work spindle at high speed and the back gear drive for rotating the work spindle at lower speeds, a belt drive arrangement from the main drive variable speed motor wholly outside of the headstock compartment containing the gear driving mechanism on the lathe headstock transmission. In this way easy access to the belt driving mechanism is obtained while at the same time completely isolating the belt drive from any lubricating difficulties which might otherwise occur should the belt drive transmission be incorporated in the same compartment with the gear drive transmission.

Thus in this transmission mechanism it is an object to provide in a lathe, a variable speed D. C. motor controlled by electronic control mechanism capable of operating from an alternating current source of supply and which variable speed motor is interconnected with a novel headstock transmission capable of providing direct drive high speed driving of the work spindle in conjunction with fine feeds, a back gear range of speeds variable through a series of speed changes by means of the variable speed main drive motor for the lower range of turning speeds, and to also provide in this transmission mechanism, means for rotating the work spindle within the lower portion of the low range of back gear speeds while providing at the same time a series of coarse thread feeding movements for the cutting tools. This latter arrangement is to permit the cutting of coarse threads or screws, or the like in the lathe while operating in a limited slow portion of the low range of speeds.

It is a further object of this invention to provide a control and dial indicating mechanism for operating the lathe headstock transmission in its various different functions which may be effected readily by the operator with a minimum of calculations or effect on his part. In this connection a novel dial arrangement is provided connected by suitable mechanical means with the headstock transmission for operating the various gear and clutch mechanisms in a predetermined sequential relationship to effect the high speed direct belt drive with fine feeds, the slower back gear drive with normal feeds, and the back gear drive through only a limited low portion of the range with coarse thread leads and feeds being provided. This control mechanism is so interrelated and interlocked that the correct sequential operation of the different functions may be readily obtained. Also, electrical interlock and control of the electronic operating mechanism of the main drive variable speed motor is also provided in conjunction with this control mechanism.

The whole indicating dial mechanism is associated with this control mechanism so that the operator can by direct observation at any time select or determine what characteristics of operation his machine is performing. This mechanism is to include dial indicating means for showing the proper cutting speeds to utilize in connection with the particular work diameter being operated upon and these series of data and information are directly interrelated with the movements of the control levers and mechanism associated therewith so that at all times the operator knows exactly what conditions are being obtained in his machine operation.

In conjunction with the electrically interlocking control mechanism and this dial indicating mechanism, apparatus is provided for automatically operating the main drive motor at a predetermined slow speed during gear changes and manipulations of the lathe transmission mechanism so that smooth gear shifting is provided to permit ease of entrance of the various gear and clutch mechanisms and freedom from noise and damage to the lathe transmission.

Further features and advantages of the above general objects will be set forth in detail with reference to the following drawings in which:

Figure I is a front elevation, partly broken away to show the location of the electronic control apparatus of a typical tool room lathe incorporating the features of this novel transmission and control mechanism.

Figure II is an enlarged fragmentary front elevation showing the headstock end of the lathe in Figure I particularly illustrating the control dial mechanism for effecting the speed changes and control headstock transmission and the related feed box mechanism of the lathe.

Figure III is a left-hand end section of the headstock end of the lathe shown in Figures I and II on the line III—III of Figures I, II, and V.

Figure IV is a vertical transverse section through the headstock end of the lathe on the line IV—IV of Figures I and V, particularly showing the gear transmission in the headstock and feed box of the lathe.

Figure V is a diagrammatic sectional view on the line V—V of Figure IV showing the lathe transmission mechanism in the headstock and the feed train gearing of the feed box mounted on the headstock.

Figure VI is a fragmentary enlarged diagrammatic section on the line VI—VI of Figure III showing the gearing connecting the power from the feed box on the headstock to the various feed and control rods going to the lathe apron mechanism.

Figure VII is an enlarged fragmentary sectional view on the line VII—VII of Figure II showing the detailed construction of the control knob and dial mechanism associated with the gear and speed changing apparatus.

Figure VIII is a fragmentary enlarged sectional view on the line VIII—VIII of Figure II showing the construction of the lubricating pump and control for connecting or disconnecting the leadscrew to the feed driving power of the lathe transmission.

Figure IX is an enlarged fragmentary sectional view on the line IX—IX of Figure II showing in detail the construction of the shifter mechanism for controlling the gears in the feed box of the lathe.

Figure X is an enlarged fragmentary sectional view on the line X—X of Figure IX.

Figure XI is an enlarged fragmentary sectional view on the line XI—XI of Figure X.

Figure XII is a fragmentary view on the line XII—XII of Figure II showing the rear portion of the headstock showing the operating and interlocking control mechanism for the dial indicating and operating mechanism for the gear transmission and the electrical control mechanism of this transmission.

Figure XIII is an enlarged sectional view of one of the control discs indicated on the line XIII—XIII of Figure XII.

Figure XIV is an enlarged section on the line XIV—XIV of Figure XII showing the other mating control disc for the control dial mechanism.

Figure XV is an enlarged fragmentary diagrammatic showing of the transmission mechanism shown in Figure V indicating the relative position of the back gear, the high speed pulley drive clutch spool, and the feed drive gear transmission when the transmission is being operated for high work spindle speeds and fine feeds.

Figure XVI is a similar fragmentary view to that of Figure XV showing the transmission in operative position when the lathe is being operated in its normal range of back gear speeds and with standard feeds.

Figure XVII shows a similar diagrammatic view of Figure XV indicating the relative position of the headstock and feed gearing when the lathe headstock transmission is being operated in the lower portion of its back gear speeds, but with coarse threads being utilized for the tool feeding mechanism.

Figure XVIII is a diagrammatic showing of the periphery of the indicating data on the main control dial mechanism for the head stock transmission showing the relative position of the data when the lathe has its transmission operating as in Figure XV for operating the lathe in the belt drive high speeds with fine feeds.

Figure XIX is a diagrammatic showing of the periphery of the part shown in Figure XII indicating the relative position of the control disc when the lathe transmission has been shifted to belt drive and fine feeds.

Figure XX is a section shown on the line XX—XX of Figure VII showing the position of the main shifter control knob and operating disc when the lathe has its transmission positioned for operating in belt drive with fine feeds.

Figure XXI is a view similar to that of Figure XVIII but showing the position of the data when the operating and control dial apparatus is moved to the back gear position for operating the work spindle in its normal range of feeds when in the lower range of spindle speeds.

Figure XXII is a diagrammatic showing of the relative position of the control discs of Figures XII, XIII, and XIV shown diagrammatically when the transmission of the lathe headstock is operating in the back gear position with standard feeds.

Figure XXIII shows the relative position of the control disc knob when the control dial mechanism is operated to effect the back gear operation with standard feeds.

Figure XXIV is a similar diagrammatic view of the control dial data as shown in Figures XVIII and XXI but indicating the relative position when the lathe is being controlled for coarse threading with the work spindle operating only in the lower range of back gear speeds.

Figure XXV again shows diagrammatically the relative positions of the control discs and apparatus shown in Figures XII, XIII, and XIV and clearly indicates the restricting movement for the range of speeds which may be effected in the back gear position of the lathe while at the same time permitting coarse threads to be obtained at the tool feeding mechanism of the lathe.

Figure XXVI shows the control knob and associated discs when moved to its position permitting coarse threading to be obtained with the lathe transmission.

In Figure I is shown a typical, modern tool room lathe to which this invention has been applied, and which comprises a bed 1 which is mounted on a leg 2 at the headstock end and a leg 3 at the tailstock end of the bed 1. On top of the bed is the headstock 4 and a tailstock 5 and the apron 6, cross slide 7 and tool post 8 in a conventional manner for such lathes. Power for rotating the work spindle 9 and work fixture 10 of lathe headstock 4 in this particular illustrative example is derived from A. C. source of electrical power usually three phase sixty cycle 220 volt or 440 volt supply. This supply voltage is impressed on the transformers 11 and 12 mounted in the leg 3 of the lathe from which relatively high voltages may be obtained for the electronic control apparatus indicated generally at 13 which are contained on a panel 14 and comprise various electronic tubes 15 and 16, control unit 17, resistors 18, fuses 19, control relay 20, and other related starter switches 21 necessary to the complete control of all of the electrical apparatus in the lathe. The detail construction and circuit of this electronic control mechanism 13 forms no detail part of this invention itself but is related directly to the invention and interconnected with it in the functions it is capable of carrying out in conjunction with the novel transmission mechanism for obtaining the desired operation of the lathe.

This electronic control mechanism 13 appropriately controls the main drive variable speed D. C. motor 22 mounted in the leg 2 of the lathe on a suitable motor bracket 23 in order to maintain the driving belts 24, Figure III, in proper tension at all times and to facilitate the easy raising of the motor by means of the eyebolt 25 to remove the belts when necessary. The belts 24 pass over the direct belt drive pulley 26 for effecting belt driving of the work spindle 9 and over the back gear pulley 27. Thus the two pulleys 26 and 27 are driven at all times by the main drive motor 22 which is capable of operating through a large range of accurately controlled variable speeds. Also the electronic control apparatus 13 is capable of rapidly stopping the main drive motor 22 for arresting spindle rotation and for causing reversal operation of motor 22 to reverse the work spindle when necessary.

The pulley 26 is journaled on a suitable bearing 28 on the work spindle 9 which work spindle in turn is carr'd on appropriate bearings 29 and 30 in the headstock housing 4. This pulley 26 is adapted to be connected positively in driving relationship to the work spindle by means of a plunger clutch comprising the pin 31 carried in a bore 32 in the sleeve 33 fixed to the work spindle and carrying the bearing 29 which supports the rear end of the spindle 9. This plunger 31 may be moved axially of the work spindle into the hole 34 in the disc 35 fixed to the pulley 26 by moving the operating spool 36 by appropriate means to be described. In this way the pulley 26 may be arranged for free rotation on the work spindle 9 when back gear driving is to be undertaken or may be locked positively in driving relationship on the work spindle 9 when the spindle is to be rotated in high speed direct belt drive.

The pulley 27 is fixed on the input shaft 37 by appropriate means 38 and which back gear shaft is mounted on suitable bearings 39 and 40 in the headstock housing 4. This back gear shaft has fixed on it a pinion 41 which is adapted to be engaged by a gear 42 of the compound gear 43 shiftable axially on the spline portion of the back gear shaft 44 carried in suitable bearings 45 and 46 in the headstock housing 4. Now this compound gear 43 also has a pinion 47 which is adapted to engage the face gear 48 on the work spindle 9 when the gear 42 is engaged with the gear 41 so as to effect back gear driving from the pulley 27 to the shaft 37, gears 41—42, and gears 47—48 to the work spindle 9. Appropriate means for operating the compound gear 43 in predetermined sequential relationship with the clutch 36 will also be described later. Thus two speed ranges for the work spindle 9 is obtained from the motor 22, one the direct belt drive when the pulley 26 is connected by means of the clutch pin 31 to the work spindle 9 for high spindle speeds and a second range of back gear speeds when the back gear 43 is shifted to engage its gear 42 with the gear 41 and its gear 47 with the gear 48 at which time the pulley 26 is disengaged from driving relationship on the spindle 9.

Referring particularly to Figures V and XV, when the lathe is being operated at belt drive for high work spindle speeds, the back gear 43 is disengaged from the gear 41 and face gear 48 on the work spindle 9 as shown in Figure XV. Also, the clutch spool 36 has pushed the pin 31 into the hole 34 in disc 35, so that pulley 26 is in direct driving engagement with the work spindle 9 and is being rotated by the main drive motor 22 at the desired selected speed of the motor 22. Under these conditions feed power take off drive for operating the cutting tools at relatively fine feeds during these high spindle speeds, is derived from the small V belt pulley 49 fixed to the shaft 37 over which operates the feed drive belt 50 which passes over a pulley 51 fixed on the shaft 52 appropriately journaled in the bracket 53 in bearings 54 which is attached to the headstock housing 4. On the inner end of the shaft 52 is a pinion 55 which is in engagement with a gear 56 journaled to freely rotate on the shaft 57 carried in bearings 58 in the headstock housing 4. Appropriate guide washers 59 fixed upon the shaft 52 each side of the gear 55 serves to keep the gear 56 in proper axial position in engagement with the gear 55 and its proper relationship on the shaft 57.

On the shaft 57 is mounted a sliding compound gear 60 having a large gear 61 and a small gear 62. At the time of this driving of the work spindle at high belt speeds, the gear 61 is in mesh with the gear 63 of the double gear 64 journaled against axial movement on a stud 65 fixed in the headstock housing 4. Also, formed on the compound gear 60 is a clutch 66 which at this time engages a mating clutch 67 formed on the gear 56 so that driving power from the shaft 52 is transmitted through the gears 55—56 to the compound gear 60 and through the gears 61—63 to the gear 64 journaled on the stud 65. Feeding power is then transmitted from the gear 64 through its gear teeth 63 to the idler gear 68 journaled on the stud 69 fixed in the inward projecting portion of the feed box housing 70 fastened to the front portion of the headstock housing 4. The gear 68 drives the single toothed clutch gear 71 journaled on the shaft 72 fixed in the feed box housing 70 and which clutch gear 71 is adapted to engage by conventional single tooth clutching means 73 and 74 the corresponding clutch gears 75 and 76 likewise journaled on the shaft 72. The gear 75 drives directly the gear 77 fixed on the shaft 78 journaled in suitable bearings in the feed box housing 70 while the gear 76 drives the idler gear 79 journaled on the shaft 69 which in turn drives the gear 80 also fixed on the shaft 78 so that by selectively clutching the gear 71 with the gear 75 the shaft 78 may be driven in one direction and by clutching the gear 71 with the gear 76 the shaft 78 may be rotated in the opposite direction through the idler 79. This provides the conventional feed reverse in head so that the feed may be reversed during thread chasing while maintaining the definite indexed relationship of the feed to spindle rotation at all times.

Feeding power is then transmitted from the shaft 78 through gear 77 to gear 81 on the tumbler gear shaft 82 of the feed box 70 when cutting regular threads and leads and shaft 84 is driven from the gear 80, driving gear 83 when cutting metric threads and leads in a manner as set forth for a typical combined English and Metric feed box such as the exemplary showing of Figure V. Such a feed box is illustrated and described in Patent 2,239,443 of April 22, 1941. Since the details of the operating mechanism in this combined English and Metric feed box forms no specific part in connection with this invention, it will, therefore, not be described in detail here except to point out that the drive as put into the feed box 70 from the shaft 78 as above pointed out is transmitted through the various gearing in the box and brought out from the shaft 84 through the change gear 85, from where it is transmitted through an appropriate change gearing as best seen in Figures III and VI comprising a change gear 86 appropriately carried on a stud 87 on the quadrant 88 fixed on the lower box housing 89 by suitable bolts 90. The gear 86 in turn drives the gear 91 on the feed power input shaft 92 journaled in the lower box 89. In place of the gears 85, 86, and 91 appropriate special conversion gears for metric thread cutting or any other special type of feeds or threads desired may be substituted to easily accomplish these results.

The feeding power from the shaft 92 is transmitted directly to the leadscrew through the clutch 93 connecting the gear 94 with the tubular member 95 fixed to the leadscrew 96 of the lathe. The gear 94 may also be shifted to the left, Figure VI, to engage its gear 97 with the gear 98 fixed on the feed rod 99 having an appropriate overload clutch 100 located between the gear 98 and the portion of the feed rod going to the lathe apron.

When it is desirable to operate the lathe in the back gear or lower range of speed and regular feed, the lathe transmission gearing is arranged as shown in Figures V and XVI. Under these conditions the compound gear 43 is moved to the right in Figure V so as to engage its gear 42 with the gear 41 and its gear 47 with face gear 48 on the work spindle 9. Also, the clutch spool 36 is moved to the right to withdraw the pin 31 from locking the pulley 26 to the work spindle 9 so that the pulley 26 will idle while being driven by the belts and main drive motor 22. Power is, therefore, being transmitted at relatively lower speed to the work spindle from the pulley 27 on shaft 37, through the compound gear 43 and the face gear 48 fixed on the work spindle 9 to thus provide a powerful slow speed drive in the work spindle in the lower ranges of cutting to be done.

At this time the clutch teeth 66 of the compound gear 60 are withdrawn from the clutch teeth 67 on the gear 56 while the gear 61 is brought into mesh with the gear 101 fixed on the work spindle 9 so that the gear 60 will be rotated directly from the work spindle in one to one ratio to provide a normal feed and thread range for the tool feed mechanism of the lathe as power is transmitted from the gear 61 to the gear 63 of the double gear 64 and through the transmission mechanism in the feed box already described. The main drive motor 22 at this time may be varied through its entire range of variable speeds by the electronic control apparatus 13 so as to provide a wide selection of spindle speeds in connection with this lower or back gear driving range in conjunction with the normal regular feeds and threads.

In some instances it is desirable to provide while the work spindle is rotating in the lower portion of the back gear range, coarse thread features in the feed mechanism by providing a relatively high rate of feeds and threads in comparison to spindle rotation. This is particularly desirable when coarse threads or screws are to be chased in the lathe. Under these conditions the headstock transmission gearing will assume the relative position of its parts as shown in Figures V and XVII in which the compound back gear 43 is moved an additional distance to the right but still maintaining its gear 42 in engagement with the gear 41 and its gear 47 in engagement with the gear 48 on the work spindle 9, but also by this movement engaging its gear 42 with a gear 102 journaled for free rotation on the work spindle 9. This gear 102 is also engaged by the gear 62 of the compound gear 60 as this latter gear is moved to its extreme right position as shown in Figure XVII. At the same time by moving the gear 60 as described, its gear 61 will be again engaged with a gear 63a of the double gear 64 so that feeding power is then transmitted to the lathe feed mechanism from the gear 42 of the compound gear 43 through the gear 102 on the spindle 9 which drives the gear 62 of the compound gear 60 and through its gear 61 rotates the double gear 64 through its gear 63a which again transmits a feeding power to the feed box transmission 70 as described. In this way the spindle may be rotated at relatively low speed while a relatively higher rate of feed may be obtained for chasing coarse thread screws or the like.

In order to readily effect the high speed belt drive, the lower range back gear drive and the coarse threading position of operation for the work spindle of the lathe, a novel indicating and control dial device is provided at the front of the headstock as best seen in Figures II and IV. This device has three main control elements, namely the motor speed control knob 103 which operates an appropriate control rheostat functioning in conjunction with the electronic control apparatus 13 for controlling the motor through its entire range of variable speeds. A push button control element 104 is provided which must be pushed in before any change in the ranges of gearing of the headstock transmission can be effected. Pushing in this knob operates suitable electrical control mechanism associated with the electronic control 13 whereby the motor, no matter at what speed at which it is rotating, is rapidly brought down to a predetermined slow speed and maintained at that slow speed of rotation during the changing of the mechanical mechanism in the headstock transmission. A gear shifting control knob 105 is also provided which effects the operation of the various mechanical positions of the mechanism as shown in Figures XV, XVI, and XVII when the push button 104 is held in to permit movement of the lever 105.

Referring particularly to Figures IV, VII, and XII the control knob 105 is fixed in a disc 106 which is rigidly attached to the rock shaft 107 by a suitable key 108 as best seen in Figure VII. This shaft 107 is journaled in a bearing 109 in the front end of the headstock housing 4 and at its rear end in a suitable bearing 109a, Figure XII. On this rock shaft 107 is formed intermittent and Geneva gearing cooperating with shifter mechanism for actuating the various gears and pulley clutch on the work spindle in a predetermined sequential relationship as the knob 105 is swung around to three positions of operation.

Referring particularly to Figures IV, XV, XVI, and XVII, on the rear portion of the rock shaft 107 is provided an intermittent gear 110 which operates in the intermittent rack 111 and dwell portion 111a of a shifter yoke 112 slidably carried on a rod 113 fixed in the headstock 4. Intermediate the length of the rock shaft 107 is fixed the intermittent gear and Geneva motion arrangement 114 which in turn operates in conjunction with an intermittent rack 115 formed on the shifter yoke 116 slidably mounted on the rod 117 fixed in the headstock housing 4. The shifter yoke 112, referring to Figure V, reaches into the headstock transmission each side of the gear 42 of the compound back gear 43 so as to slide this gear 43 on the shaft 44. The shifter yoke 116 has a portion 116a which reaches into the headstock transmission and controls the sliding motion of the gear 60. On the front of the rock shaft 107 just inside the gearing 109 is formed the intermittent and Geneva motion gear 118 which operates with an intermittent rack 119 of the shifter yoke 120 which reaches and controls the sliding motion of the clutch spool 36 which connects or disconnects the belt driving pulley 26 to or from the work spindle 9.

In Figures XX, XXIII, and XXVI are shown the disc 106 to which the control knob 105 is attached and the three respective operating positions 105a, 105b, and 105c of the handle 105. When the handle 105 is in position 105a the gear transmission in the headstock is arranged for high speed belt driving with fine feeds. In position 105b the gearing in the headstock is arranged for the lower range or back gear speeds with normal feed. And when in position 105c the normal range of spindle speeds usable in the lower portion thereof with coarse threads is available.

In Figure XV is shown the arrangement of the headstock gearing as above described for high speed belt driving of the work spindle with fine feeds and at which time the control knob 105 is in position 105a and the rock shaft 107 is so turned that the gear 110 has its dwell portion 110a in the dwell portion 111a of the intermittent rack 111 of the shifter 112 so that the back gear 43 is shifted to the neutral position shown. The intermittent gear 114 will be positioned with its dwell portion 114a just entering the dwell portion 115a of the rack on the shifter 116, so that initial motion of the gear 114 in counterclockwise direction as the knob 105 is moved from position 105a to 105b will have no effect in moving the shifter 116 until the position 105b is almost reached, to in this way permit adequate travel of the back gear 43 into its driving position shown in Figure XVI, while moving the gear 60 only through its relatively limited travel in the same period of time. Likewise the gear 118 on the rock shaft 107 has its tooth 118a just ready to enter into the tooth 119a of the intermittent rack 119 of the shifter 120 so that as the knob 105 is moved from position 105a to position 105b the pin 31 will be withdrawn to release the driving pulley 26 from the work spindle. Thus in moving the rock shaft 107 by the lever 105 from the position 105a to position 105b the back gear 43, the clutch spool 36 and the gear 60 will be moved from the position shown in Figure XV to the position shown in Figure XVI. Likewise when the rock shaft 107 is moved by moving the lever 105 from position 105b to position 105c the rearrangement of the gearing in the transmission will be that of the change from Figure XVI to Figure XVII. In this case the intermittent gear 110 brings the gear teeth 110b into operative relation with the rack teeth 111 of shifter yoke 112 so as to further move the back gear 43 to maintain its gear 42 into engagement with the gear 41 and its gear 47 in engagement with the face gear 48 while also bringing gear 42 into engagement with gear 102. During this time also it will be noted that the intermittent gear 118 has its dwell portion 118b functioning so as to have no effect on moving the yoke 120 since the clutch spool 36 has been already moved to the point where the pulley 26 is disengaged from the work spindle. The gear 114 has its gear teeth 114b brought into operative relation with the teeth 115 of the shifter yoke 116 so that it will be moved further to the right in Figure XVII to bring the gear 62 of the gear 60 into engagement with the gear 102 journaled on the work spindle. Likewise the reverse condition pertains when the control knob 105 is moved from the position 105c back through position 105b to position 105a.

In order to assist the operator in properly positioning the control knob 105 and disc 106 for the three main positions of belt drive, back gear drive, and coarse threads, an indicating pointer 121 is provided on the headstock housing 4 as indicated in Figures III, IV, VII, XVIII, XXI, and XXIV and on the periphery of the disc 106 are provided the markings 122 for the belt drive, 123 for the back gear, and 124 for the coarse threads, which respective marks may be brought into alignment with the indicating arrow 121 on the headstock 4 by moving the handle 105 to the three positions 105a, 105b, and 105c.

Referring particularly to Figures VII and XII, the knob 103 is rotated to control the electronic apparatus 13 through a control rheostat 125 carried at the rear of the headstock in a suitable cover plate 126 held in place by screws 127. The push rod 128 passing through the center of the rock shaft 107 is connected to the bushing 129 fixed to the knob 103 by the pin 130 by means of the tongue 131 on the sleeve 129 which operates in a slot 132 in the push button 104. This push button is securely fixed to the end of the push rod 128 by threaded connections 133. On the rear portion of the push rod 128 is fixed a gear 134 by means of a suitable pin 135 which passes through the hub of the gear 134 and a sleeve 136 directly mounted upon the push rod 128. This gear 134 engages a gear 137 fixed on the shaft 138 of the rheostat 125 so that when rotating the knob 103 the push rod 128 will likewise be rotated and through the medium of the gears 134 and 137 the rheostat 125 may be turned to effect the complete range of variable speeds of rotation for the main drive motor 22.

The main drive motor 22 is automatically slowed down from any speed at which it may be operated to a predetermined slow speed and maintained at that slow speed by pushing in on the push button 104 which moves the push rod 128 to the left in the Figures VII and XII to cause its outer end 128a to engage the plunger 139 of the control switch 140 and to press in on this plunger 139 to cause this switch to operate in conjunction with the electronic control mechanism 13 to effect this slow predetermined speed of rotation for the motor 22.

The control knob 105 and its disc 106 cannot be moved unless the push button 104 is being held in so that the motor 22 must always be operating at its slow predetermined speed before any changes of gearing can be made by manipulating the lever 105 and the disc 106. This apparatus is best shown in Figures XII, XIII, and XIV. On the rear end of the rock shaft 107 is fixed a disc 141 which is free to rotate with the shaft 107 as it is rocked to its three operative positions above described. Journaled to rotate on the sleeve 136 fixed to the push rod 128 is the disc 142 which is held against rotation relative to the headstock housing of the lathe by a set screw 143 threaded into the headstock housing 4 and projecting into an axially extending slot 144 whereby the disc 142 while it is prevented from rotating still permits the push rod 128 with its bushing 136 thereon to rotate freely inside its bore 142b. The axial extension of the slot 144 also permits the push rod and disc 142 to be moved axially with the axial movement of the push rod 128.

In the disc 142 is carried a headed floating pin 145 which is normally confined with its head fully in the disc 142 by the inner face 134a, as best seen by reference to Figures XIX, XXII, and XXV, which show a diagrammatic peripheral development of the gear 134 and the discs 142 and 141. Referring particularly to Figure XIX, the pin 145 is arranged to engage in the respective positioning holes 146, 147, and 148, Figure XIII, corresponding to the positions 105a, 105b, and 105c for the lever 105. In order that the pin 145 may be entered into any of these three holes 146, 147, and 148 it is necessary first to push in on the push button 104 to operate the limit switch or control switch 140 to slow the motor 22 down to the predetermined slow speed so as to thereby prevent operation of the lever 105 unless the motor is operating at the slow speed. These holes also serve to position the control lever 105 in the three predetermined positions for the lathe headstock transmission. Referring to Figures V and XII, it will be noted that when the push button 104 is pushed inwardly operating the switch 140 the pin 145 will be withdrawn out of a hole in the disc 141. Thus the rock shaft 107 may be rotated to any of its desired three positions and then the push button may be released and it will jump back under the influence of the spring 149, Figure VII, to its normal operative position thus locking the shifting lever in any selected position. It will be noted by this arrangement that since the pin 145 normally engages the surface 134a of the gear 134 the push button can likewise not jump back into operative or normal motor speed operation unless the shifting mechanism is in one of the three operative positions.

It is to be noted in this arrangement that the rheostat 125 is for effecting any of the variable speeds of rotation for the main drive motor 22 may be operated through its entire range by rotating the knob 103 to the desired setting but this complete range of operation is limited only to the positions 105a and 105b for the control lever 105 of the headstock transmission. In other words, in this arrangement it is possible to utilize the complete speed range of the main drive motor 22 when the lathe is positioned in the high speed belt drive range or the lower speed back gear drive range. However, it is to be distinctly noted that in this arrangement the spindle speeds obtainable when doing coarse threading are strictly limited to the lower range of the speed of rotation of the main drive motor 22, specifically in this embodiment to the lower thirty per cent of speed range of the motor when the headstock transmission is arranged for coarse threading operation. The understanding of this interlocking safety feature in connection with this control arrangement is best understood by reference to Figures XIX, XXII, and XXIV. In Figure XIX is shown the relative position of the parts of Figure XII when the lathe is operating in the high speed belt drive position. Here it will be seen that the plunger 145 is entered into the bottomless hole 146 in the disc 141 so that the surface 134a of the gear 134 contacts the top of the head of the plunger 145 so that this gear 134 may be rotated freely through its entire distance of travel necessary to operate the rheostat 125 through its complete operative arc for controlling the speed of the motor 22 through its entire range.

Referring to Figure XXII here we see the relative positions of the parts in Figure XII when the lathe is operating in the back gear or standard lower range of speed of operation with normal feed for the cutting tool. Here again the plunger 145 is entered into a bottomless hole 147 so that again the gear 134 may have free rotation through its entire arc of travel for actuating the rheostat 125 for complete range of control of the motor 22.

In Figure XXV is shown the relationship of the parts in Figure XII when the lathe is operating in the coarse threading position, at which time it would be dangerous and highly undesirable to permit any very rapid rotation of the work spindle when very coarse threads were being utilized because of damage to the feeding mechanism due to its excessively rapid operation with high spindle speed which would thereby take place. Therefore, in order to limit the range of speed to which the rheostat 125 may be operated the pin 145 in this last position of coarse threads is entered into a hole 148 having a predetermined depth so that the head of the pin 145 projects outwardly beyond the face 142a of the disc 142 and enters into a groove 150 formed in the face 134a of the gear 134. Thus when properly engaged in the coarse thread position the gear 134 can only move a limited distance of travel, namely that of the extent of travel of the head of the plunger 145 in the slot 150, this slot being arranged and so positioned relative to the setting of the rheostat 125 that the speed range is only the lower third of the complete range of speed for the motor 22, thus limiting any possibility of rapid rotation of the work spindle during the coarse threading position.

Now, in order to prevent the coarse threading position from being selected and engaged when the rheostat would be set at too high a position, an interference arrangement is provided comprising a projecting lug 151 fixed in the disc 141 and of such height that in order to move the plunger from the locating hole 147 in disc 141 to the hole 148 it is necessary that the portion 150 in the gear 134 be brought somewhere within the vicinity of the relative position shown in Figure XXV or else the lug 151 striking the end 145a of the pin 145 when held fully inwardly by the surface 134a of the gear 134 would prevent making the shift or movement of the lever 105 from position 105b to position 105c. Thus is provided an interlocking mechanism whereby first of all the rheostat controlling the main drive motor is operable through its entire range of speed control in the high speed belt drive position and in the back gear position but is only operable in the lowest portion of its range of variable speeds when the transmission in the headstock is arranged for coarse threading. Also the transmission is so arranged that it is not possible to make the change from either the belt drive or the back gear speed ranges to the coarse threading position unless the main drive motor is operating in its relatively lower ranges of speed. In this way complete safety interlocks of the relative positions of the feeding mechanism and transmission of the lathe are provided.

In order to indicate the exact speed being obtained by manipulation of the rheostat control knob 103 both when the headstock transmission is operating in the belt drive high speed position or the lower range back gear drive a graduated indicating dial 152, Figures VII and XVIII, is provided which is arranged around and fixed to the member 103 by an appropriate set screw 153. On the periphery 152a of this graduated collar 152 are inscribed the spindle speeds obtained by rheostat control of the main drive motor 22 for the high range or belt drive position in the column 154 and the graduated collar is inscribed with the speeds obtained when the gear transmission is operated in the back gear position in the column 155. In order to automatically tell which column is to be read when the lathe is operating in the belt drive or back gear position indicating means is automatically operable by the movement of the lever 105 when moved from either position 105a or to position 105b for showing which scale 154 or 155 is to be read. This comprises a pair of discs 156 and 157 which are tied together and rotate together by means of a tie bar 158b securely fixed by suitable screws 159 and 160 to the respective discs 156 and 157. These discs are freely rotatable on the member 103, see Figure VII. On the periphery of the disc 156 is the indicating spindle speeds mark 161 which comes into the position shown in Figure XVIII when the lever 105 is in position 105a for belt driving. On the disc 157 is provided the spindle speeds indicating mark 162 which comes into position shown in Figure XXI when the control lever 105 is moved to the position 105b. This is accomplished by means of the apparatus shown in Figures VII, XX, and XXIII. Referring to these figures, it will be noted in Figure VII, there is a pin 163 fixed in the headstock housing 4 which operates in the arcuate slot 164 formed in the disc 106 to stop the disc 106 in the position 105a by engagement with the end of the arcuate slot 164a, as shown in Figure XX. Now as the disc 106 is rotated counterclockwise, Figure XX, a spring 165 carried in the arcuate slot 166 formed in the disc 106 and engaging the end 166a of this slot and abutting against a pin 167 fixed in the disc 156 rotates this disc, and through the tie bar 158 also rotates the disc 157 with it, so as to alternately bring the indicating spindle speeds mark 161 to the position shown in Figure XVIII when the lever is in the 105a position shown in Figure XX, and brings up the indicating mark 162 when rotated to the position 105b as shown in Figures XXI and XXIII. This motion in moving lever 105 from position 105a to position 105b also carries with it the pin 168 fixed in the disc 156 and operating in the arcuate slot 164 and brings it into engagement with the fixed pin 163. Thus upon further movement of the control knob 105 from position 105b to position 105c the discs 156 and 157 no longer rotate but remain stationary causing the spring 165 to be compressed to the point shown in Figure XXVI until the lever 105 gets to position 105c whereupon the arcuate end 164b of the slot 164 engages the pin 168 and also holds it against the pin 163 as seen in this figure. Frictional engagement of the spring 135a in the gear 134, Figure XII, sufficiently overcomes the presence of the compressed spring 165, Figure XXVI, by engagement with the face 142a of the non-rotating disc 142 to maintain the lever 105 in position 105c. In this way the low range spindle speeds indicator mark 162 is not changed in position as there is no difference in the spindle speed range when in back gear or in coarse threading position, in both cases the lower range or back gear arrangement is utilized. It is to be pointed out, however, as explained above only the lower portion of this low range of spindle speeds may be utilized, preferably from the speed of 30 R. P. M. down to 3.6 R. P. M. as provided by the limiting slot 150 as best indicated in Figure XXV described. Thus in this arrangement at all times the operator has before him the exact spindle speeds he is obtaining without any mental calculation, figuring, or other skill required to find out exactly what speeds he is getting at his work spindle. No matter where he positions the lathe headstock transmission or the rheostat for controlling the main drive motor speed he always has direct indication of precisely what he is getting on the machine.

Associated with the dial indicating mechanism, Figures II, VII, XVIII, XXI, and XXIV, is indicating means for selecting the proper cutting speeds to be used for a given work diameter being machined in the lathe. On the control knob 103 is provided a conical surface 103a best seen in Figure VII upon which are formed graduations shown in Figures II, XVIII, XXI, and XXIV, showing the range of work diameters that can be turned in the lathe, in this particular instance from one-quarter inch up to sixteen inches in diameter. In the Figures XVIII, XXI, and XXIV the diagrammatic showing is so arranged as to indicate the conical surface 103a as a cylindrical surface for purposes of adequate comparison with the graduated collar 152 to facilitate an understanding of the detail operation of the indicating mechanism. Figure II, however, shows the graduation for work diameter in inches in their actual relationship on the member 103. These graduations rotate with the movement of the knob 103 and are timed with the motion of the graduated collar 152.

On the conical surface 157a of the collar 157 is provided two series of graduations, one showing the cutting speed in feet per minute when the high range of spindle speeds of the belt drive position, is in operation and a second series of indications showing cutting speeds in feet per minute when the lower range of back gear drive speeds are being used. It is to be noted that the two series 169 for the high speed range and 170 for the back gear range are each successively presented to observable position in exact relationship with the movement of the spindle speeds indicating lines 161 and 162 so that the operator cannot be confused or be required to do any careful observing of the indicating mechanism to determine which range of cutting speeds in feet per minute is applicable to the spindle speed ranges to be utilized in the lathe. The work diameters in inches of course indicated at 171 are arranged to properly orient themselves with both of the scales 169 and 170 so that at all times the desired cutting speed may be obtained for the particular diameter of work being machined in the lathe at the indicated spindle speed in scales 154 or 155.

Thus it can be seen that the operator may easily select the desired spindle speed merely by finding the diameter of work to be turned and the cutting speed at which it is to be turned. It is to be further noted in studying the scales 154 and 155 that an adequate overlap is provided for the spindle speeds between approximately 20 and 250 R. P. M., the purpose of which is to make possible the use of the belt drive smooth operating features even in relatively low ranges of normal turning operations in the lathe so that the large diameters can be turned in the lathe while still utilizing the belt drive advantage for elimination of chatter and marring of the work surface in turn. Also it is to be noted that the lower range 155 goes down to 3.6 R. P. M. to permit the chasing of relatively large diameter coarse threads, screws, taps and the like. Also the back gear range is sufficiently high to permit heavy roughing cuts on work where gear driving is desirable.

Referring particularly to Figure II it will be noted that all of the other essential controls for the lathe feed mechanism are closely arranged and of the same general character as that of the spindle speed control dial mechanism above described. A rotatable control knob 172 mounted on a rock shaft 173 journaled in the feed box housing 70 has on its inner end a rocking arm 174 containing a pair of pins 175 and 176 which operate in appropriate slotted portions on the respective shifter yokes 177 and 178 slidably mounted on rods 179 and 180 in the feed box 70. Shifter yoke 177 controls the sliding motion of the gear 81 and its associated gear 181 of the compound gear 182 mounted on the tumbler gear shaft 82, Figure V. The shifter yoke 178 controls the sliding motion of the gear 83 on the cone gear shaft 183. Rotation of the control knob 172 to either of its positions 172a or 172b effects either the Metric system or English operation of the feeding mechanism for the tool carriage of the lathe. It will be noted that this knob 172 is mounted directly below the control dial mechanism of Figure VII on the line 184, Figure II.

Below this Metric or English selecting knob 172 is the control knob 185 mounted on the rock shaft 186 journaled in the feed box housing 70 upon which is carried a pair of operating cams 187 operating in the shifter yoke 188 and the scroll cam 189 having a circular cam path 190. The shifter yoke 188 is mounted slidably at one end on a pin 191 in the feed box housing 70 and has its other end carried on a pin 192 supported in the shifter yoke 193, Figure XI, which extends into the angular slot 194 of the gear 195, Figure V, of the feed box 70. The cam 187 operated in the elliptical hole 196 in the shifter member 188 so as to shift the pin 192 horizontally for engagement of the gear 195 in one or the other of its shifted positions clearly set forth in the above mentioned Patent No. 2,239,443.

The scroll cam 189 has its circular slot 190 operating about the pin 197 of the shifter yoke 198, which shifter yoke actuates the double gear 199 shown in Figure V and as set forth in said mentioned patent. Thus by rotation of the control knob 185 to its various positions 185a, b, c, d, e and f various coarse feed and speed changes for the feed mechanism of the lathe are readily accomplished. Again it can be seen that the control knob 185 is located in the main vertical line of arrangement 184 for easy access by the operator in making the various adjustments of control in the feed mechanism of the lathe.

Now referring more specifically to Figures II, VI and VIII, a final control knob 200 is provided on a rock shaft 201 journaled in the lower housing 89 and has a shifter arm 202 with a roller 203 which engages in the annular slot of the gear 94, Figure VI, and which may be rotated either to its "thread" position or its "feed" position for purposes of connecting or disconnecting the lead screw 96 from operation with the feed mechanism of the lathe and to alternately put into operation the feed rod 99 when the lead screw is disconnected and vice versa. Just above the knob 200 is located the main electric control push button station 204 which contains the start button 205 and the stop button 206 which puts into operation the electronic control mechanism 13, Figure I, and also has a red indicating light 207 which indicates whether or not the electrical apparatus is in operating condition or not.

This electrical control push button station 204 also controls the rapid traverse and lubricating pump drive motor 208, best seen in Figure IV, which drives to appropriate gearing 209 and the gear 210 the drive shaft 211 which extends toward the front of the machine as shown best in Figures IV and VIII and is appropriately supported in suitable bearings 212 carrying the bevel gear 213 which in turn drives a bevel gear 214, Figure VI, on the rapid traverse drive shaft 215 which goes to the apron mechanism of the lathe for effecting rapid tool movement in the carriage and cross slide thereof. The end of this shaft 211 also by suitable connecting means, such as the tongue and key arrangement 216 drives the lubricating pump 217 for lubricating the headstock gearing transmission and feed box of the lathe described. In conjunction with this lubricating pump 217 is a small bleeder pipe 218 through which oil is constantly precipitated into the viewing chamber 219 of the oil pump indicator 220, Figure II, and from which oil drains through the passageway 221 back into the lubricating system of the machine. An oil filter actuating knob 222 is also conveniently located in close association with the rest of the above described control elements which may be readily operated by the lathe hand to maintain cleanliness and proper lubricating action of the oiling system for the headstock transmission.

When it is desired to reverse the work spindle or to momentarily stop it as when changing tools for measuring the work, or mounting the work in the lathe chuck fixtures, the main drive motor 22 may be readily brought to an instantaneous stop or reversed by means of the reversing and plugging switch control 223, Figures IV and VI, operating in conjunction with the electronic control apparatus 13 and which is actuated from the spindle control rod 224, Figure VI, through appropriate linkage mechanism indicated generally at 225 and which control rod 224 extends to the apron where an appropriate operating handle may be readily manipulated to thus control the main drive motor 22 for stopping or reversal. The usual feed reverse mechanism for actuating the sliding clutch gear 71, Figure V, mounted on shaft 72 in the feed box is provided in the conventional way by means of an axially movable control rod 226, Figure VI, which actuates the swinging shifter lever 227 to an appropriate connection 228 which is pivotally mounted on a shaft 229, Figure IV, and has an upwardly projecting arm 230 which reaches around the annular slot 231 of the clutch gear 71 so as to axially shift it appropriately on the shaft 72 in the conventional manner.

Certain improvements and reorganization of the control lever 232 for the fine increment of speed changes in the feed box 70 have been made in that the main control arm 233 of the control lever 232 is positioned, as best seen in Figure V, between the headstock and the feed box rather than bringing this arm out into the front of the feed box for example as shown in Design Patent 128,258 of July 15, 1941. As a result of this structural rearrangement the arm 233 fastened on the tumbler gear shifter cylinder 234 does not interfere with the front portion of the feed box and makes possible the inclusion of the indicating index plate drum 235 in the readily visible location as shown in Figure II. This also permits of positioning the control knob 232 more closely to the general speed control dial indicating mechanism on the front of the headstock to thereby minimize the various different directions the operator must reach to fully control every operation of this tool.

Having thus fully set forth and described my invention, what I claim as new and desire to secure by United States Letters Patent is:

1. In a lathe transmission mechanism, a variable speed motor, electronic control means for varying the speed of said motor, a work spindle, change speed gearing associated with said work spindle, belted means for directly driving said work spindle or said change speed gearing associated therewith, said belted means being in common belted driving relationship to both said direct work spindle driving means and said change speed gearing.

2. In a lathe transmission mechanism, a variable speed motor, electronic control means for varying the speed of said motor, a work spindle, change speed gearing associated with said work spindle, belted means for directly driving said work spindle or said change speed gearing associated therewith, said belted means being in common belted driving relationship to both said direct work spindle driving means and said change speed gearing and means for alternately rendering said direct belt drive means or said change speed gearing respectively operative so as to either directly belt drive said work spindle from said main drive motor through said belted transmission means or drive said work spindle through said change speed gearing from said belted driving means.

3. In a lathe headstock transmission, a work spindle, change speed gearing associated with said work spindle, a driving motor, a pulley journaled on said spindle, means for connecting or disconnecting said pulley in driving relationship on said work spindle, a second pulley connected to said change speed gearing, common belted transmission means from said motor, operating over both of said pulleys, and means for alternately connecting said pulley on said spindle in driving relationship thereto for direct belt driving of said spindle by said motor or rendering said change speed gearing operative while disconnecting said pulley on said work spindle from driving relationship when driving said work spindle through said change speed gearing at a reduced rate of speed.

4. In a lathe headstock transmission, a headstock housing, a spindle journaled in said housing, change speed gearing in said housing associated with said work spindle, a pulley located on said work spindle exterior of the cavity of said headstock housing, a second pulley also located outside of said cavity connected with said change speed gearing, a driving motor for said headstock transmission, and belted means interconnecting said motor with both of said pulleys so as to form a common belted transmission means exterior of said headstock for operating said work spindle directly from said main drive motor or driving it through said back gear when said first mentioned direct pulley drive for said work spindle is rendered inoperative.

5. In a lathe headstock transmission, a headstock housing, a work spindle journaled in said headstock, a back gear transmission in said headstock associated with said work spindle, a driving pulley journaled on the rear end of said work spindle exterior of the cavity in said headstock housing, means on said work spindle in said headstock cavity and operable to connect or disconnect said pulley in driving relationship on said work spindle, a back gear shaft of said back gear transmission projecting outwardly from said headstock cavity having a pulley fixed thereon in alignment with said first mentioned pulley on said work spindle, a driving motor for said headstock transmission, and common belted means operable over both of said pulleys.

6. In a lathe headstock transmission, a headstock housing, a work spindle journaled in said headstock, a back gear transmission in said headstock associated with said work spindle, a driving pulley journaled on the rear end of said work spindle exterior of the cavity in said headstock housing, means on said work spindle in said headstock cavity and operable to connect or disconnect said pulley in driving relationship on said work spindle, a back gear shaft of said back gear transmission projecting outwardly from said headstock cavity having a pulley fixed thereon in alignment with said first mentioned pulley on said work spindle, a driving motor for said headstock transmission, and common belted means operable over both of said pulleys and means for alternately connecting said first mentioned pulley in driving relationship on said work spindle while disconnecting said back gear transmission and for rendering said back gear transmission operative when said pulley on said work spindle is disconnected from driving relationship thereon.

7. In a lathe transmission, a work spindle, a back gear transmission associated with said work spindle, feed transmission gearing associated with said work spindle and back gear transmission, a driving motor for said lathe transmission, means for connecting said driving motor directly to said work spindle for high speed driving thereof or to said back gear transmission for rotating said work spindle in a lower speed range, power take-off for operating said feed transmission gearing from said back gear transmission mechanism when said work spindle is being directly driven at high speed by said motor to obtain fine feed for the feed mechanism of said lathe, and to effect power take-off directly from said work spindle to actuate said feed transmission in regular feeds when said back gear transmission is rendered operative for driving said work spindle in said relatively lower speed range.

8. In a lathe transmission, a work spindle, a back gear transmission associated with said work spindle, feed transmission gearing associated with said work spindle and back gear transmission, a driving motor for said lathe transmission, means for connecting said driving motor directly to said work spindle for high speed driving thereof or to said back gear transmission for rotating said work spindle in a lower speed range, power take-off for operating said feed transmission gearing from said back gear transmission mechanism when said work spindle is being directly driven at high speed by said motor to obtain fine feed for the feed mechanism of said lathe, and to effect power take-off directly from said work spindle to actuate said feed transmission in regular feeds when said back gear transmission is rendered operative for driving said work spindle at said relatively lower rate of speed, and means for effecting coarse feeds for the feed mechanism of said lathe by driving said feed transmission from said back gearing when said back gearing is rendered operative in rotating said work spindle in the lower range of speeds.

9. In a lathe transmission, a work spindle, a back gear transmission associated with said work spindle, feed transmission gearing associated with said work spindle and back gear transmission, a driving motor for said lathe transmission, means for connecting said driving motor directly to said work spindle for high speed driving thereof or to said back gear transmission for rotating said work spindle in a lower speed range, power take-off for operating said feed transmission gearing from said back gear transmission mechanism when said work spindle is being directly driven at high speed by said motor to obtain fine feed for the feed mechanism of said lathe, and to effect power take-off directly from said work spindle to actuate said feed transmission in regular feeds when said back gear transmission is rendered operative for driving said work spindle at said relatively lower rate of speed, and means for effecting coarse feeds for the feed mechanism of said lathe by driving said feed transmission from said back gearing when said back gearing is rendered operative in rotating said work spindle in the lower range of speeds and means associated with the engagement of said feed drive transmission in coarse threading position to prevent said driving motor from being operated at a speed greater than a predetermined slow rate of rotation.

10. In a lathe transmission, a work spindle, a back gear transmission associated with said work spindle, feed transmission gearing associated with said work spindle and back gear transmission, a driving motor for said lathe transmission, means for connecting said driving motor directly to said work spindle for high speed driving thereof or to said back gear transmission for rotating said work spindle in a lower speed range, power take-off for operating said feed transmission gearing from said back gear transmission mechanism when said work spindle is being directly driven at high speed by said motor to obtain fine feed for the feed mechanism of said lathe, and to effect power take-off directly from said work spindle to actuate said feed transmission in regular feeds when said back gear transmission is rendered operative for driving said work spindle at said relatively lower rate of speed, and means for effecting coarse feeds for the feed mechanism of said lathe by driving said feed transmission from said back gearing when said back gearing is rendered operative in rotating said work spindle in the lower range of speeds and means associated with the engagement of said feed drive transmission in coarse threading position to prevent said driving motor from being operated at a speed greater than a predetermined slow rate of rotation, and means preventing the operation of said lathe at coarse threading by actuation of said feed drive transmission from said back gearing unless said main driving motor is operating within a predetermined low range of speed.

11. In a lathe transmission mechanism, means for rotating a work spindle at relatively high speed, means for rotating said work spindle at a lower speed, a main drive motor, means for varying the rate of rotation of said motor, feed transmission mechanism associated with said lathe transmission for effecting fine feed in said feed transmission when said work spindle is operating in the high range of speeds, means for effecting standard rates of speed when said work spindle is operative in said lower range of speeds, and means whereby coarse threading may be effected in the feed transmission when said variable speed driving motor is operating in a predetermined low portion of its variable rate of speed, means to prevent connecting said feed drive transmission in coarse threading arrangement unless said motor is operative in said predetermined low portion of its variable rate of speed, and means preventing said motor from being raised above said higher rate of rotation than said predetermined lower range of rotation while said coarse thread driving of the feed transmission is being effected.

12. In a lathe transmission mechanism, a work spindle, a back gear transmission associated with said work spindle, feed transmission gearing associated with said work spindle, a main drive motor, belted transmission means connectable to said work spindle or said back gear transmission, means for effecting feed power take-off for actuating said feed transmission gearing directly from the belt drive transmission from said main drive motor to said back gear transmission when said work spindle is being directly driven by belted transmission means from said main drive motor, means for effecting feed power take-off directly from said work spindle when said back gear transmission is operative to drive said work spindle with said direct belted drive transmission means to said work spindle rendered inoperative, and means for obtaining feed power take-off from said back gear transmission for actuating said feed transmission when said back gear transmission is rendered operative and said direct belt driving of said work spindle is rendered inoperative.

13. In a lathe transmission mechanism, a variable speed prime mover for driving said transmission mechanism, means for varying the rate of speed of said prime mover, a work spindle, means for connecting said prime mover directly to said work spindle for rotating said work spindle at relatively high speed, means for connecting said prime mover through a change speed transmission mechanism for rotating said work spindle at a lower rate of speed, feed transmission gearing connected to be driven from said change speed transmission and adapted to effect fine rates of feed in said feeding mechanism when said work spindle is being directly driven at variable high rates of speed by said prime mover, means for effecting normal rates of feeding in the tool feeding mechanism of said lathe when said work spindle is being driven at lower relative rates of speed by said change speed transmission, and means for effecting coarse threading feed movements in the feed mechanism of said lathe when said lathe spindle is being driven while said variable speed prime mover is operating in a restricted lower portion of its variable speed range.

14. In a lathe transmission mechanism, a variable speed prime mover for driving said transmission, means for varying the rate of speed of said prime mover, a work spindle, means for connecting said prime mover directly to said work spindle for rotating said work spindle at relatively high speed, a change speed transmission mechanism means for connecting said prime mover through said change speed transmission mechanism for rotating said work spindle at a lower rate of speed, feed transmission gearing connected to be driven by said change speed transmission adapted to effect fine rates of feed in said feeding mechanism when said work spindle is being directly driven at variable high rates of speed by said prime mover, means for effecting normal rates of feeding in the tool feeding mechanism of said lathe when said work spindle is being driven at lower relative rates of speed by said change speed transmission, and means for effecting coarse threading feed movements in the feed mechanism of said lathe when said lathe spindle is being driven while said speed prime mover is operating in a restricted lower portion of its variable speed range, and means preventing the institution of coarse threading feeding movement in said feed transmission when said work spindle is being driven in the high range of speeds directly from said prime mover.

15. In a lathe transmission mechanism, a variable speed prime mover for driving said transmission, means for varying the rate of speed of said prime mover, a work spindle, means for connecting said prime mover directly to said work spindle for rotating said work spindle at relatively high speed, a change speed transmission mechanism, means for connecting said prime mover through said change speed transmission mechanism for rotating said work spindle at a lower rate of speed, feeding mechanism, feed transmission gearing associated with said lathe transmission adapted to be driven from said change speed mechanism to effect fine rates of feed in said feeding mechanism when said work spindle is being driven at variable high rates of speed by said prime mover, means for effecting normal rates of feeding in the tool feeding mechanism of said lathe when said work spindle is being driven at lower relative rates of speed by said change speed transmission, and means for effecting coarse threading feed movements in the feed mechanism of said lathe when said lathe spindle is being driven while said speed prime mover is operating in a restricted lower portion of its variable speed range, and means preventing the institution of coarse threading feeding movement in said feed transmission when said work spindle is being driven in the high range of speeds directly from said prime mover, and means preventing the operation of said feed transmission gearing in coarse threading movement unless said prime mover is operating in said restricted lower portion of its variable speed range.

16. In a lathe transmission mechanism, a variable speed prime mover for driving said transmission, means for varying the rate of speed of said prime mover, a work spindle, means for connecting said prime mover directly to said work spindle for rotating said work spindle at relatively high speed, a change speed transmission mechanism, means for connecting said prime mover through said change speed transmission mechanism for rotating said work spindle at a lower rate of speed, feeding mechanism, feed transmission gearing associated with said lathe transmission adapted to be driven from said change speed transmission mechanism to effect fine rates of feed in said feeding mechanism when said work spindle is being driven at variable high rates of speed by said prime mover, means for effecting normal rates of feeding in the tool feeding mechanism of said lathe when said work spindle is being driven at lower relative rates of speed by said change speed transmission, and means for effecting coarse threading feed movements in the feed mechanism of said lathe when said lathe spindle is being driven through said change speed mechanism while said prime mover is operating in a restricted lower portion of its variable speed range, and means preventing the operation of said feed transmission gearing in coarse threading movement unless said prime mover is operating in said restricted lower portion of its variable speed range, and means preventing the institution of coarse threading feeding movement in said feed transmission when said work spindle is being driven in the high range of speeds directly from said prime mover, and means preventing the operation of said prime mover in any but said predetermined restricted lower portion when said feed gearing is operating in coarse threading condition.

17. In a lathe transmission, a rotatable work spindle, an input shaft, a back gear shaft located intermediate of said work spindle and said input shaft, gearing on said work spindle and input shaft, a back gear on said back gear shaft engageable or disengageable with said gearing, a pulley fixed on said input shaft, a pulley journaled on said work spindle, a driving motor, common belted means connecting said motor with both of said pulleys, means for connecting or disconnecting said second mentioned pulley to or from driving engagement on said work spindle, and means for engaging or disengaging said back gear in operative relationship with said spindle and input shaft.

18. In a lathe transmission, a rotatable work spindle, an input shaft, a back gear shaft located intermediate of said work spindle and said input shaft, gearing on said work spindle and input shaft, a back gear on said back gear shaft engageable or disengageable with said gearing, a pulley fixed on said input shaft, a pulley journaled on said work spindle, a driving motor, common belted means connecting said motor with both of said pulleys, means for connecting or disconnecting said second mentioned pulley to or from driving engagement on said work spindle, and means for engaging or disengaging said back gear in operative relationship with said spindle and input shaft, feed power take-off mechanism associated with said transmission comprising a shaft, gearing connecting said shaft to the feed transmission gearing of said lathe, means for driving said shaft by belted transmission means from said main drive motor to effect fine feeds in said feed transmission, means for driving said shaft directly from said work spindle to effect standard feeds and threads in said feed transmission, and means for driving said shaft from said back gear for effecting coarse threading operation of said feed transmission.

19. A lathe headstock transmission, a headstock housing, a work spindle journaled in said housing, an input shaft journaled in said housing, an intermediate back gear shaft journaled in said housing, gearing on said work spindle and back gear shaft, and a sliding back gear on said intermediate back gear shaft engageable or disengageable with said gearing on said spindle and intermediate shaft, a pulley fixed on said input shaft, a pulley journaled on said work spindle, means for connecting or disconnecting said second mentioned pulley in driving relationship on said work spindle, a main drive motor, and belted transmission means for driving both of said pulleys from said motor.

20. A lathe headstock transmission, a headstock housing, a work spindle journaled in said housing, an input shaft journaled in said housing, an intermediate back gear shaft journaled in said housing, gearing on said work spindle and back gear shaft, and a sliding back gear on said intermediate back gear shaft engageable or disengageable with said gearing on said spindle and intermediate shaft, a pulley fixed on said input shaft, a pulley journaled on said work spindle, means for connecting or disconnecting said second mentioned pulley in driving relationship on said work spindle, a main drive motor, and belted transmission means for driving both of said pulleys from said motor, feed power take-off for said lathe feed mechanism comprising a feed shaft, means for connecting said feed shaft to the feed mechanism of said lathe, means for driving said feed shaft, when said work spindle is being driven by direct pulley drive, by belted transmission means connected to said input shaft, and a second feed shaft journaled in said headstock, gearing connecting said second feed shaft to said first mentioned feed shaft so that said second mentioned feed shaft will be rotated by the rotation of said input shaft.

21. A lathe headstock transmission, a headstock housing, a work spindle journaled in said housing, an input shaft journaled in said housing, an intermediate back gear shaft journaled in said housing, gearing on said work spindle and back gear shaft, and a sliding back gear on said intermediate back gear shaft engageable or disengageable with said gearing on said spindle and intermediate shaft, a pulley fixed on said input shaft, a pulley journaled on said work spindle, means for connecting or disconnecting said second mentioned pulley in driving relationship on said work spindle, a main drive motor, and belted transmission means for driving both of said pulleys from said motor, feed power take-off for said lathe feed mechanism comprising a feed shaft, means for connecting said feed shaft to the feed mechanism of said lathe, means for driving said feed shaft, when said work spindle is being driven by direct pulley drive, by belted transmission means connected to said input shaft, and a second feed shaft journaled in said headstock, gearing connecting said second feed shaft to said first mentioned feed shaft so that said second mentioned feed shaft will be rotated by the rotation of said input shaft, means for driving said feed mechanism of said lathe at regular feeds by direct gear driving of said second mentioned feed shaft from gearing fixed on said work spindle, and means for driving said second mentioned feed shaft for coarse threading actuation of said feed transmission of said lathe by a driving gear journaled on said work spindle driven by said back gear.

22. In a lathe transmission mechanism operable to provide high speed spindle rotation with fine feeds, lower speed spindle rotation with regular feeds, and slow spindle speeds with coarse threading, a common operating means for effecting said three conditions of operation of said transmission mechanism, driving means for said transmission mechanism, and means positively reducing the speed of said driving means below a predetermined maximum before said common operative means may be actuated to effect said three changes of operation of said transmission.

23. In a lathe transmission mechanism capable of providing high spindle speeds with fine feeds, slower spindle speeds with normal feeds and threads, and slow spindle speeds with coarse threading, a common control lever associated with said mechanism operative to a plurality of three positions for effecting each of said above three modes of operation in said transmission mechanism, push button control mechanism associated with said lever effective to control the speed of the driving motor for said transmission, and interlocking means between said push button and control lever to prevent manipulation of said lever to any of its three operative positions unless said push button is depressed to thereby effect a predetermined slow speed of rotation of said driving motor when a speed change is to be effected in said lathe transmission.

24. In a change speed transmission mechanism for a lathe, means in said transmission operable to effect high spindle speeds with fine feeds, slower spindle speeds with standard feeds and threads, and a low range of speeds with coarse threads, a single operative control lever associated with said transmission movable to a series of positions to effect said three operations for said transmission mechanism, a variable speed driving motor for operating said transmission, control means for effecting variable rates of rotation in said driving motor, and interlocking means between said lever and control means whereby when said control lever is moved to a position to effect slow spindle speeds with coarse threading said variable speed control means must be positioned in a predetermined lower portion of the lower speed range of said driving motor.

25. In a change speed transmission mechanism for a lathe, means in said transmission operable to effect high spindle speeds with fine feeds, slower spindle speeds with standard feeds and threads, and a low range of speeds with coarse threads, a single operative control lever associated with said transmission movable to a series of positions to effect said three operations for said transmission mechanism, a variable speed driving motor for operating said transmission, control means for effecting variable rates of rotation in said driving motor, and interlocking means between said lever and control means whereby when said control lever is moved to a position to effect slow spindle speeds with coarse. threading said variable speed control means must be positioned in a predetermined lower portion of the lower speed range of said driving motor, and further interlocking means between said control lever and said variable speed control device whereby said variable speed control device cannot be moved out of said predetermined lower range of variable speeds so long as said control lever is in the slow speed coarse threading position.

26. In a change speed transmission mechanism for a lathe, means in said transmission operable to effect high spindle speeds with fine feeds, slower spindle speeds with standard feeds and threads, and a low range of speeds with coarse threads, a single operative control lever associated with said transmission movable to a series of positions to effect said three operations for said transmission mechanism, a variable speed driving motor for operating said transmission, control means for effecting variable rates of rotation in said driving motor, and interlocking means between said lever and control means whereby when said control lever is moved to a position to effect slow spindle speeds with coarse threading said variable speed control means must be positioned in a predetermined lower portion of the lower speed range of said driving motor, and further interlocking means between said control lever and said variable speed control device whereby said variable speed control device cannot be moved out of said predetermined lower range of variable speeds so long as said control lever is in the slow speed coarse threading position, and a third control means for said driving motor operable at any time to effect a predetermined slow rate of rotation therein, and interlocking means between said last mentioned control means and said lever whereby said lever cannot be shifted to any of its three positions unless said last mentioned control device has been operated to cause said driving motor to operate at said predetermined slow speed.

27. In a lathe transmission and control mechanism, a headstock housing, a work spindle journaled in said headstock, transmission mechanism in said headstock adapted to provide high speed spindle driving with fine feeds, lower speed spindle driving with regular feeds and threads, and low speed driving of said work spindle with coarse threads, driving means associated with said headstock transmission, a single lever control device movable to a plurality of positions to effect said three conditions of operation for said headstock transmission mechanism, a control device for varying the speed of said driving means for said headstock transmission associated with said single lever control device, and dial indicating means inter-related with said single lever control and said variable speed control device having direct reading indication for any position of said single lever control and said variable speed control device.

28. In a lathe transmission and control mechanism, a headstock housing, a work spindle journaled in said headstock, transmission mechanism in said headstock adapted to provide high speed belt spindle driving with fine feeds, lower speed back gear spindle driving with regular feeds and threads, and low speed driving of said work spindle with coarse threads, driving means associated with said headstock transmission, a single lever control device movable to a plurality of positions to effect said three conditions of operation for said headstock transmission mechanism, a control device for varying the speed of said driving means for said headstock transmission associated with said single lever control device, and dial indicating means inter-related with said single lever control and said variable speed control device having direct reading indication for any position of said single lever control and said variable speed control device, said indicating mechanism comprising an indicating line fixed on said headstock, three indicating marks associated with said single lever control indicating said belt spindle drive, said back gear drive, and said low speed driving positions, spindle speed indicating graduations on said variable speed control device, and indicating reference lines movable to appropriate readable positions to agree with said variable speed indicating graduations by the movement of said single lever control member when at said belt drive or said back gear speed positions of indication.

29. In a lathe transmission and control mechanism, a headstock housing, a work spindle journaled in said headstock, transmission mechanism in said headstock adapted to provide high speed belt spindle driving with fine feeds, lower speed back gear spindle driving with regular feeds and threads, and low speed driving of said work spindle with coarse threads, driving means associated with said headstock transmission, a single lever control device movable to a plurality of positions to effect said three conditions of operation for said headstock transmission mechanism, a control device for varying the speed of said driving means for said headstock transmission associated with said single lever control device, and dial indicating means inter-related with said single lever control and said variable speed control device having direct reading indication for any position of said single lever control and said variable speed control device, said indicating mechanism comprising an indicating line fixed on said headstock, three indicating marks associated with said single lever control indicating said high speed belt spindle drive, back gear spindle driving, and low speed driving positions, spindle speed indicating graduations on said variable speed control device, and indicating reference lines movable to appropriate readable positions to agree with said variable speed indicating graduations by the movement of said single lever control member when at said belt drive or said back gear speed positions of indication, and dial indicating means associated with both said single lever control and said variable speed control devices for indicating the cutting speeds in feet per minute with reference to selected work diameters to be machined in said lathe, said last mentioned indicating means being movable with the variable speed indications associated with said variable speed control device.

30. Dial indicating mechanism for a lathe having a change speed transmission movable to a selected one of three positions, viz., high speed belt driving with fine feeds, back gear driving with normal feeds, and back gear driving with coarse feeds, variable speed driving means for said transmission, a single lever connected to effect movements of said transmission as aforesaid and movable to any one of three positions, each corresponding to one of said transmission positions, two sets of spindle speed graduations adjacent said lever, one corresponding to said high speed belt driving, and the other to said back gear driving, a pair of interconnected indicia, each related to a respective set of graduations, and means moving said indicia in unison by operation of said lever, whereby each indicium is in operative position with respect to its set of graduations only when said lever is in a corresponding position of adjustment, said sets of graduations being shiftable relatively to said indicia to effect changes of speed in said driving means.

31. In a lathe, a work spindle, a driving means directly connectable to said spindle, change speed gearing connected to drive said spindle, a driving motor, means connecting said motor to continuously drive both said driving means and said change speed gearing, and means selectively operable to alternatively connect said spindle to said driving means or to said change speed gearing.

32. In a lathe transmission, a work spindle, a first pulley journaled on said spindle, back gear means connectable to drive said spindle, a second pulley connected to drive said back gear means, feeding means, shiftable means operable between first and second positions to connect and disconnect said first pulley to and from said spindle, belt means for driving said feeding means from said second pulley, and means operated by actuation of said shiftable means to connect said belt means to said feeding means in its said first position and to disconnect said belt means and connect said feeding means to said back gear means in its said second position.

33. In a lathe transmission, a spindle, a first drive pulley coaxial with said spindle, back gear means connectable to said spindle, a second drive pulley connected to said back gear means, common belt means driving said pulleys, shiftable means operable between first and second positions to connect and disconnect said first pulley with said spindle, feeding means, a belt drive from one of said pulleys to said feeding means, and control means operable to simultaneously move said shiftable means to second position, disconnect said belt drive, and connect said back gear means to said spindle and feeding means.

34. In a lathe transmission, a spindle, a pulley coaxial with said spindle, first means operable between first and second positions to connect and disconnect said pulley with said spindle, back gear means connectable to drive said spindle, a second pulley connected to drive said back gear means, a common belt drive for said pulleys, belt driven means connectable to drive said feeding means from one of said pulleys, a gear journaled on said spindle and means operable to simultaneously operate said first means to second position, disconnect said belt driven means, connect said back gear means to said spindle and said gear on said spindle and connect said gear to said feeding means.

35. In a lathe transmission, a spindle, a gear journaled on said spindle, a first drive pulley coaxially journaled with said spindle, a first back gear shaft, a second drive pulley fixed to said shaft, common belt means driving said pulleys, a second back gear shaft, gear means on said second back gear shaft slidable to connect said first back gear shaft to said gear journaled on said spindle, shiftable means operable between first and second positions to relatively drivingly connect and disconnect said first drive pulley relative to said spindle, feeding gear means, a disconnectable feeding gear drive from one of said pulleys to said feeding gear means, and means operable by and upon actuation of said shiftable means to second position to disconnect said feeding gear drive, connect said back gear shaft to said gear on said spindle, and connect said gear on said spindle to said feeding gear means.

36. In a lathe transmission, a spindle, a gear journaled on said spindle, back gear means connectable to said spindle and gear, feeding gear means, a common disconnectable high speed drive for said spindle and feeding gear means, and means operable to disconnect said high speed drive and connect said back gear means to said spindle and gear, and said gear to said feeding gear means.

37. In a lathe, a spindle, a back gear means connectable to and disconnectable from said spindle, a common drive direct to said spindle and said back gear means, a variable speed motor connected to operate said drive, feeding gear means, selective drive means operable from a first position connecting said common drive direct to said feeding gear means to a second position connecting said common drive means to said feeding gear means through said back gear means, a lever operable between first and second positions to control the corresponding positions of said selective drive means, a rotatable control element connected to govern the speed of said motor, and means operated by said lever to limit the rotation of said element when said lever is in said second position.

WILLIAM F. GROENE.

REFERENCES CITED

The following references are of record in the file of this patent:

UNITED STATES PATENTS

| Number | Name | Date |
|---|---|---|
| 2,110,173 | Pohl et al. | Mar. 8, 1938 |
| 2,164,884 | Nenninger et al. | July 4, 1939 |
| 2,161,545 | Groene et al. | June 6, 1939 |
| 6,755 | Chanin | Oct. 2, 1849 |
| 2,197,893 | Le Blond et al. | Apr. 23, 1940 |
| 2,218,182 | Senger | Oct. 15, 1940 |
| 2,331,695 | Johnson | Oct. 12, 1943 |
| 1,952,966 | Bechler | Mar. 27, 1934 |
| 2,105,288 | Linden | Jan. 11, 1938 |
| 1,655,036 | Alexanderson | Jan. 3, 1928 |

FOREIGN PATENTS

| Number | Country | Date |
|---|---|---|
| 115,655 | Britain | May 6, 1918 |